(12) United States Patent
Yoshinori et al.

(10) Patent No.: US 7,113,100 B2
(45) Date of Patent: Sep. 26, 2006

(54) VEHICLE TIREDNESS ALLEVIATING SYSTEM

(75) Inventors: Takeshi Yoshinori, Okazaki (JP); Tsuyoshi Nakagawa, Aichi-gun (JP)

(73) Assignee: DENSO Corporation, Kariya (JP)

( * ) Notice: Subject to any disclaimer, the term of this patent is extended or adjusted under 35 U.S.C. 154(b) by 60 days.

(21) Appl. No.: 10/803,492

(22) Filed: Mar. 18, 2004

(65) Prior Publication Data

US 2004/0201481 A1    Oct. 14, 2004

(30) Foreign Application Priority Data

| Mar. 20, 2003 | (JP) | ............................. 2003-077281 |
| Mar. 20, 2003 | (JP) | ............................. 2003-077282 |
| Mar. 27, 2003 | (JP) | ............................. 2003-088677 |

(51) Int. Cl.
*B60Q 1/00* (2006.01)
*G08B 23/00* (2006.01)
*A61B 5/00* (2006.01)
*A61B 5/02* (2006.01)
*A61B 5/08* (2006.01)
*A47C 3/025* (2006.01)
*A47C 4/54* (2006.01)

(52) U.S. Cl. ...................... 340/575; 340/576; 340/439; 600/300; 600/301; 600/484; 297/284.1; 297/284.4; 297/284.6; 297/284.9

(58) Field of Classification Search ........ 340/575–576, 340/573.1, 439; 128/666, 687, 639, 702; 600/300–301, 484; 297/284.1, 284.4, 284.6, 297/284.9
See application file for complete search history.

(56) References Cited

U.S. PATENT DOCUMENTS

| 4,706,072 | A | * | 11/1987 | Ikeyama ...................... 340/576 |
| 5,127,708 | A | * | 7/1992 | Kishi et al. ............... 297/284.1 |
| 5,523,664 | A | * | 6/1996 | Ogasawara .................. 318/590 |
| 6,014,081 | A | * | 1/2000 | Kojima et al. .............. 340/576 |

FOREIGN PATENT DOCUMENTS

| JP | 04-158807 | 6/1992 |
| JP | 5-49668 | 3/1993 |
| JP | 06-107032 | 4/1994 |
| JP | 06-277131 | 10/1994 |
| JP | WO 96/05475 | 2/1996 |
| JP | 10-504977 | 5/1998 |
| JP | 10-165380 | 6/1998 |
| JP | 2001-120626 | 5/2001 |
| JP | 2002-65650 | 3/2002 |
| JP | 2002-178744 | 6/2002 |
| JP | B-3433408 | 5/2003 |

* cited by examiner

OTHER PUBLICATIONS

Office Action dated Apr. 25, 2006 related to corresponding Japanese Application No. 2003-077282.

*Primary Examiner*—Daniel Wu
*Assistant Examiner*—Lam Pham
(74) *Attorney, Agent, or Firm*—Harness, Dickey & Pierce, PLC

(57) ABSTRACT

A vehicle tiredness alleviating system provided with at least one of a vehicle air-conditioning system for controlling a temperature in a passenger compartment, a seat heating system for heating the surface of a seat, and a seat vibration system for repeatedly vibrating a seat for a predetermined time, further provided with a means for judging the tiredness degree of a passenger seated on a seat in the passenger compartment and a means for performing at least one of temperature control of the vehicle air-conditioning system, temperature control of the seat heating system, and control of the vibration strength or vibration time of the seat vibration system.

39 Claims, 19 Drawing Sheets

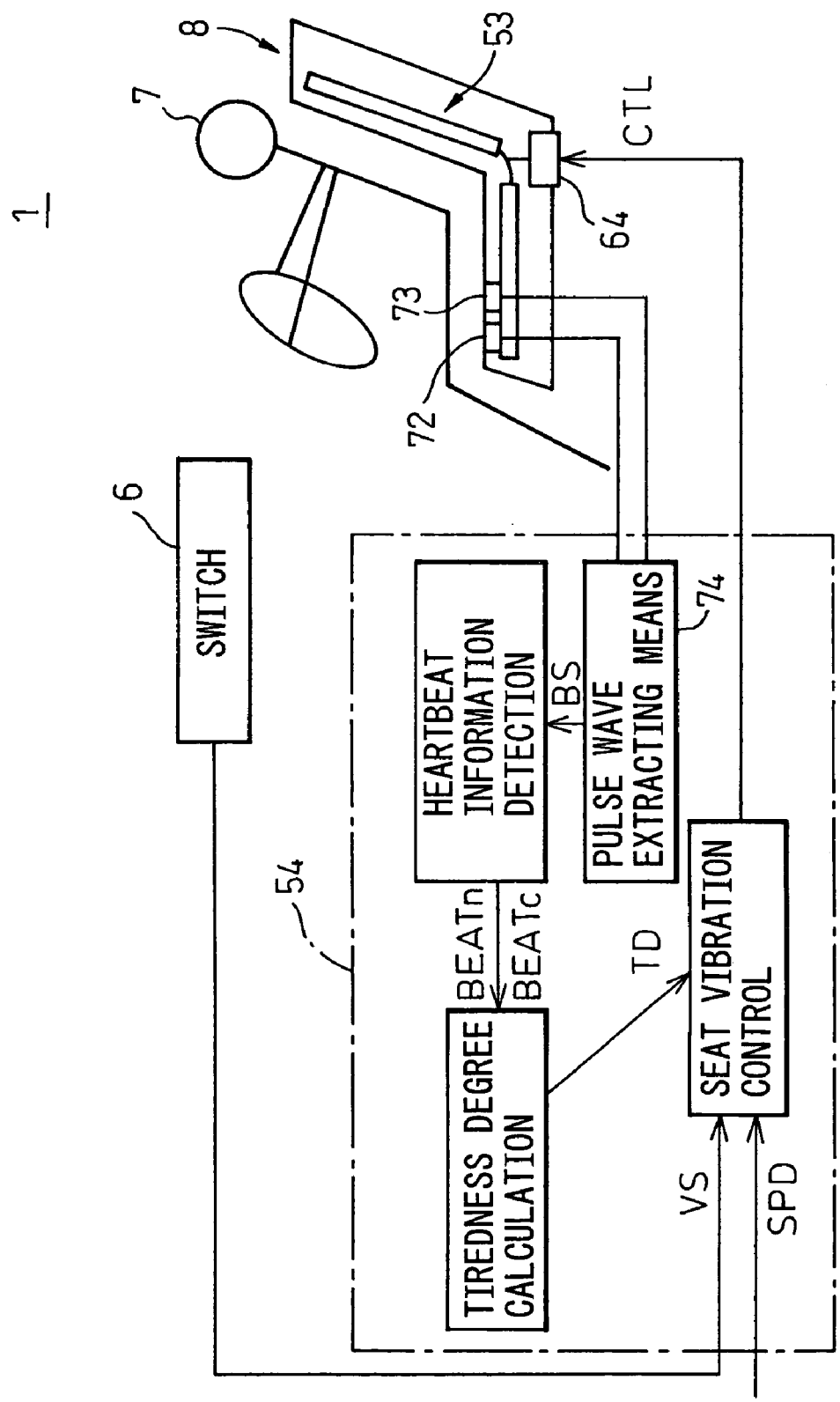

VEHICLE TIREDNESS ALLEVIATING SYSTEM

CROSS REFERENCE TO RELATED APPLICATION

This application is based upon and claims the benefit of priority from the prior Japanese Patent Application No. 2003-77281, filed on Mar. 20, 2003, No. 2003-77282, filed on Mar. 20, 2003, and No. 2003-88677, filed on Mar. 27, 2003, the entire contents of which are incorporated herein by reference.

BACKGROUND OF THE INVENTION

1. Field of the Invention

The present invention relates to vehicle tiredness alleviating system, more particularly relates to a vehicle tiredness alleviating system which judges the tiredness of a driver and controls the air-conditioning, adjusts the temperature of the seat, or causes the seat to vibrate in accordance with the judged tiredness.

2. Description of the Related Art

In the past, it has been proposed to adjust the temperature of a vehicle seat using a seat heater, seat air-conditioner, etc. In the case of a seat heater, for example an electric heater buried inside the seat is used to warm the seat to a temperature set by the driver. A seat air-conditioner uses a device for heating and cooling air to blow warm air or cool air from a plurality of air vents provided at the seat and thereby bring the seat temperature near the temperature setting.

Further, in vehicle seats etc., it has been proposed to build in a vibration unit causing vibration inside a seat and use this to make the seat vibrate so as to give vibration to a seated person to reduce tiredness or suppress an increase in tiredness. If giving vibration to a seated person, the muscles and veins relax and circulation is promoted, whereby removal of fatigue substances is promoted and thereby tiredness is reduced or the increase in tiredness is suppressed.

Further, as a vehicle air-conditioning system, a vehicle air-conditioning system provided with an air-conditioning system unit, a pressure sensor provided at the driver's seat for detecting a pulse wave of the driver, and a tiredness judging means for estimating (judging) the tiredness of the driver based on a detection signal from the pressure sensor and outputting a command signal based on the judged tiredness to the air-conditioning system unit has been proposed.

In the above related art, however, even when a person sitting on a seat becomes tired, the seat temperature is controlled to approach the temperature setting, so in the state where the seat temperature is higher compared with the temperature setting, even when the seated person is tired, the seat will be cooled or the heating of the seat will be stopped, so the back, lumbar, calves, and other parts of the body contacting the seat will be cooled and the flow of blood will become poor. If continuing to sit in this state for a long time, the veins will become constricted, so the blood flow will become poorer, fatigue substances will build up, and tiredness will not be eliminated or tiredness will increase.

Further, in the related art, the seat is vibrated only when the seated person turns an on/off switch of the vibration unit on. For example, even if the seated person becomes tired by sitting and driving etc. for a long time, if the seated person does not notice this or does not turn the switch on even if noticing it, the vibration of the vibration unit will not be utilized for reducing tiredness or suppressing an increase in the tiredness.

Still further, according to the vehicle air-conditioner of the related art, the detection signal of a pressure sensor includes a noise component due to bodily movement of the driver itself or bodily movement of the driver occurring along with driving of the vehicle in addition to the pulse wave component of the driver, so it is difficult for the tiredness judging means to accurately judge tiredness of the driver and it cannot judge tiredness with a high precision. Therefore, when the driver is not tired, the air-conditioning is controlled to reduce tiredness and the driver becomes numbed or when the driver is tired, the air-conditioning is controlled only as normal and the control of the air-conditioning for reducing tiredness does not work.

SUMMARY OF THE INVENTION

An object of the present invention is to provide a vehicle tiredness alleviating system able to adjust the temperature of a seat while reducing tiredness of a seated person or suppressing an increase in tiredness.

Another object of the present invention is to provide a vehicle tiredness alleviating system able to reduce the tiredness of a seated person or suppress an increase in tiredness by causing a seat to vibrate without requiring operation of a switch by the seated person.

Still another object of the present invention is to provide a vehicle tiredness alleviating system able to judge tiredness with a high precision and thereby enable effective control of air-conditioning for reducing tiredness without numbing the driver.

To achieve the above objects, a vehicle tiredness alleviating system of a first aspect of the present invention is a vehicle tiredness alleviating system provided with at least one of a vehicle air-conditioning system for controlling a temperature in a passenger compartment, a seat heating system for heating the surface of a seat, and a seat vibration system for repeatedly vibrating a seat for a predetermined time, the vehicle tiredness alleviating system further provided with a means for judging the tiredness degree of a passenger seated on a seat in the passenger compartment and, said vehicle tiredness alleviating system performs at least one of temperature control of the vehicle air-conditioning system, temperature control of the seat heating system, and control of the vibration strength or vibration time of the seat vibration system based on the tiredness degree of said passenger, which is judged by said means for judging the tiredness degree.

In particular, the vehicle tiredness alleviating system of a second aspect of the present invention is further provided with a heating means (3, 37) for heating a seat (8), a seated person information detecting means (2, 150, 160) for detecting seated person information relating to a person (7) sitting on the seat (8), a tiredness judging means (165, 170) for judging if the seated person (7) is tired based on the seated person information, and a heating control means (180, 185, 190, 195) for controlling the heating by the heating means (3, 37) based on the results of judgment by the tiredness judging means (165, 170).

By adopting this configuration, by controlling the heating means based on the results of judgment as to if the tiredness judging means judges that the seated person is tired, it is possible to reduce the tiredness of the seated person or suppress an increase in tiredness.

In particular, a vehicle tiredness alleviating system according to a third aspect of the present invention makes the heating means (3, 37) heat the seat (8) by the heating control means (180, 185, 190, 195) when the tiredness judging means (165, 170) judges that the seated person (7) is tired. By doing this, it is possible to promote the flow of blood of the seated person and effectively reduce tiredness or suppress an increase of tiredness.

Further, a vehicle tiredness alleviating system according to a fourth aspect of the present invention performs the heating in this case for a predetermined duration. By performing the heating for a predetermined duration, a seated person will feel hot or feel uncomfortable less frequently compared with continuous heating.

Further, in a vehicle tiredness alleviating system according to a fifth aspect of the present invention, the tiredness judging means (165, 170) calculates a tiredness degree showing the extent of tiredness of the seated person (7) based on the seated person information as criteria for judging if the seated person (7) is tired, and the heating control means (180, 185, 190, 195) determines the predetermined duration of heating based on the tiredness degree. By configuring the system in this way, the duration of heating is suitably set based on the tiredness degree, so heating for more than the necessary time and thereby the seated person feeling the seat hot and feeling uncomfortable can be avoided.

In a vehicle tiredness alleviating system according to a sixth aspect of the present invention, in the vehicle tiredness alleviating system according to the second aspect, the heating control means (180, 185, 190, 195) sets a target temperature of the seat (8) based on the results of judgment by the tiredness judging means (165, 170) and controls the heating by the heating means (3, 37) so that the temperature of the seat (8) approaches the target temperature. When the tiredness of the seated person is detected in this way, if setting a suitable target temperature for reducing tiredness or suppressing an increase in tiredness and controlling heating by the heating means so that the temperature of the seat approaches this target temperature, more than the necessary heating and thereby the seated person feeling the seat hot and feeling uncomfortable can be avoided.

In this case, in a vehicle tiredness alleviating system according to a seventh aspect of the present invention, the heating control means (180, 185, 190, 195) determines the target temperature based on the tiredness degree calculated by the tiredness judging means (165, 170). By doing this, it is possible to more suitably set the target temperature so as to reduce tiredness and suppress the increase of tiredness of the seated person.

Further, in a vehicle tiredness alleviating system according to an eighth aspect of the present invention, the heating control means sets the target temperature to a first predetermined temperature when the tiredness degree is a first predetermined value to less than a second predetermined value and sets the target temperature to a second predetermined temperature higher than the first predetermined temperature when the tiredness degree is the second predetermined value or more. In particular, in a vehicle tiredness alleviating system according to a ninth aspect of the present invention, it is possible to use a temperature close to human skin temperature as the first predetermined temperature. If controlling heating by the heating means so that the temperature of the seat approaches a temperature close to human skin temperature when tiredness of the seated person is detected and raising the target temperature when tiredness of a higher extent is detected, it is possible to suitably heat the seat in accordance with the tiredness degree of the seated person.

Further, in a vehicle tiredness alleviating system according to a 10th aspect of the present invention, the heating control means (180, 185, 190, 195) controls heating to be performed for a predetermined duration so that the temperature of the seat (8) approaches the target temperature determined based on the tiredness degree when tiredness of the seated person (7) is detected. Further, in a vehicle tiredness alleviating system according to an 11th aspect of the present invention, the predetermined duration is determined based on the tiredness degree. If performing heating based on the tiredness degree for a predetermined duration in this way, heating continuously for more than the necessary time and thereby the seated person feeling the seat hot and feeling uncomfortable can be avoided.

In this case, in a vehicle tiredness alleviating system according to the 12th aspect of the present invention, the heating control means sets the predetermined duration of heating to a first predetermined time when the tiredness degree is a third predetermined value to less than a fourth predetermined value and sets the predetermined duration to a second predetermined time longer than the first predetermined time when the tiredness degree is a fourth predetermined value or more. If setting the predetermined duration of heating longer when a higher extent of tiredness is detected from a seated person in this way, it is possible to heat the seat for a suitable duration in accordance with the tiredness degree of the seated person.

In a vehicle tiredness alleviating system according to a 13th aspect of the present invention, in the vehicle tiredness alleviating system of the second aspect, when providing a cooling means (37) for cooling the seat (8), the cooling control means (185, 195) for controlling cooling by the cooling means (37) performs control based on the results of judgment by the tiredness judging means (165, 170). If controlling the cooling means based on the results of judgment as to if the tiredness judging means judges that a seated person is tired, it is possible to reduce the tiredness of the seated person or suppress the increase in tiredness.

In particular, in a vehicle tiredness alleviating system according to a 14th aspect of the present invention, if the cooling control means (185, 195) causes the cooling of the seat (8) by the cooling means (37) to stop when the tiredness judging means (165, 170) judges that the seated person (7) is tired, it is possible to effectively reduce tiredness of the seated person and suppress an increase of tiredness.

Further, in a vehicle tiredness alleviating system according to a 15th aspect of the present invention, the cooling is stopped in this case for a predetermined duration. Further, in a vehicle tiredness alleviating system according to a 16th aspect of the present invention, this predetermined duration is determined based on the tiredness degree calculated by the tiredness judging means (165, 170). By configuring the system in this way, since the cooling is stopped for a suitable duration determined based on the tiredness degree when tiredness of the seated person is detected, compared with the case of continuously stopping the cooling, cooling being stopped for a longer than necessary time and thereby the seated person feeling the seat hot and feeling uncomfortable can be avoided.

In a vehicle tiredness alleviating system according to a 17th aspect of the present invention, in the vehicle tiredness alleviating system of the 13th aspect of the present invention, the cooling control means (185, 195) sets a target temperature of the seat (8) based on the results of judgment by the tiredness judging means (165, 170) and controls the cooling by the cooling means (37) so that the temperature of the seat (8) approaches the target temperature. By setting a suitable target temperature to reduce tiredness or suppress an increase of tiredness and controlling the cooling by the cooling means so that the temperature of the seat approaches the target temperature when tiredness of the seated person is detected in this way, the cooling being weakened or stopped more than necessary and thereby the seated person feeling the seat hot and feeling uncomfortable can be avoided.

In this case, in a vehicle tiredness alleviating system according to an 18th aspect of the present invention, if the cooling control means (185, 195) determines the target temperature based on the tiredness degree calculated by the tiredness judging means (165, 170), it is possible to set a more suitable target temperature for reducing the tiredness of the seated person or suppressing an increase of tiredness.

Further, in a vehicle tiredness alleviating system according to a 19th aspect of the present invention, the cooling control means sets the target temperature at a first predetermined temperature when the tiredness degree is a first predetermined value to less than a second predetermined value and sets the target temperature to a second predetermined temperature higher than the first predetermined temperature when the tiredness degree is the second predetermined value or more. In particular, in a vehicle tiredness alleviating system according to a 20th aspect of the present invention, a temperature close to human skin temperature is used as the first predetermined temperature. If controlling the cooling by the cooling means so that the temperature of the seat approaches a temperature close to human skin temperature when tiredness of the seated person is detected and raising the target temperature when tiredness of a higher extent is detected, it is possible to suitably reduce or stop cooling in accordance with the tiredness degree of the seated person.

Further, in a vehicle tiredness alleviating system according to a 21st aspect of the present invention, the cooling control means (185, 195) controls the cooling by the cooling means for a predetermined duration so that the temperature of the seat (8) approaches the target temperature determined based on the tiredness degree when the tiredness of the seated person (7) is detected. Further, in a vehicle tiredness alleviating system according to a 22nd aspect of the present invention, the predetermined duration is determined based on the tiredness degree. If controlling cooling for reducing tiredness for a predetermined duration determined based on the tiredness degree, the cooling being weakened or stopped more than necessary and thereby the seated person feeling the seat hot and feeling uncomfortable can be avoided.

In particular, in a vehicle tiredness alleviating system according to a 23rd aspect of the present invention, the cooling control means sets the predetermined duration of control of cooling for reducing tiredness to a first predetermined time when the tiredness degree is a third predetermined value to less than a fourth predetermined value and sets the predetermined duration to a second predetermined time longer than the first predetermined time when the tiredness degree is a fourth predetermined value or more. If setting the duration of control of cooling for reducing tiredness longer when tiredness of a higher extent is detected from a seated person, it is possible to control cooling for reducing tiredness for a suitable duration in accordance with the tiredness degree of a seated person.

In a vehicle tiredness alleviating system according to a 24th aspect of the present invention, in the vehicle tiredness alleviating system of the second aspect, the seated person information detecting means detects at least one of bio information, motion information, and seated duration of the seated person (7) as the seated person information. If judging whether or not a seated person is tired based on the bio information, motion information, and seated duration of the seated person in this way, accurate judgment becomes possible.

Further, in a vehicle tiredness alleviating system according to a 25th aspect of the present invention, in the vehicle tiredness alleviating system of the fifth aspect, the seated person information detecting means detects a heartbeat signal from the seated person (7) as the seated person information, and the tiredness judging means (165, 170) calculates the tiredness degree based on the heartbeat signal. In particular, in a vehicle tiredness alleviating system according to a 26th aspect of the present invention, the tiredness judging means (165, 170) calculates a normal number of heartbeats and a current number of heartbeats of the seated person (7) from the heartbeat signal and calculates the ratio by which the current number of heartbeats falls compared with the normal number of heartbeats as the tiredness degree. The heartbeat signal can be detected relatively simply from a seated person, so if calculating the tiredness degree based on the heartbeat signal, it is possible to calculate the tiredness degree simply and more accurately.

Further, the vehicle tiredness alleviating system of the present invention is particularly effective if used for adjustment of the temperature of a seat installed in a passenger compartment. A person sitting on a seat of a vehicle often is forced to sit there for a certain extent of time. In particular, a driver sitting at the driver's seat easily tires due to driving. Therefore, if adjusting the seat temperature to reduce tiredness by the vehicle tiredness alleviating system of the present invention, it would be possible to reduce tiredness of the seated person or suppress an increase in tiredness.

Still further, a vehicle tiredness alleviating system according to a 27th aspect of the present invention is provided with a vibration generating means (53) for making a seat (8) vibrate, a seated person information detecting means (2, 750, 760) for detecting seated person information relating to a person (7) sitting on the seat (8), a tiredness judging means (765, 770) for judging if the seated person (7) is tired based on the seated person information, and a vibration control means (780, 90) for controlling vibration by the vibration generating means (53) based on results of judgment by the tiredness judging means (765, 770).

By having the vibration control means control the vibration generating means based on the results of judgment as to if the tiredness judging means judges the seated person is tired, there is no need for operation by the seated person and the tiredness of the seated person can be reduced or an increase of tiredness suppressed utilizing the vibration generating means.

In particular, in a vehicle tiredness alleviating system according to a 28th aspect of the present invention, the vibration control means (780, 790) causes the vibration generating means (35) to vibrate the seat (8) when the tiredness judging means (765, 770) judges that the seated person (7) is tired. By doing this, it is possible to promote the flow of blood of the seated person and effectively reduce tiredness or suppress an increase of tiredness.

Further, in a vehicle tiredness alleviating system according to a 29th aspect of the present invention, vibration by the vibration generating means (35) is performed for a predetermined duration when tiredness of the seated person (7) is detected. By doing this, compared with when continuously vibrating, the seated person feels vibration of the seat as being uncomfortable less often.

Further, in a vehicle tiredness alleviating system according to a 30th aspect of the present invention, the tiredness judging means (765, 770) calculates a tiredness degree showing an extent of tiredness of the seated person (7) based on the seated person information as criteria for judging if the seated person (7) is tired, and the vibration control means (780, 790) determines the predetermined duration based on the tiredness degree. By configuring the system in this way, the duration of the vibration is suitably set based on the tiredness degree, so vibration of the seat continuously for more than the necessary time and thereby the seated person feeling uncomfortable can be avoided.

In a vehicle tiredness alleviating system according to a 31st aspect of the present invention, in a vehicle tiredness alleviating system of the 27th aspect, the vibration control means (780, 790) sets the strength of vibration of the seat (8) based on the results of judgment by the tiredness judging means (765, 770) and controls vibration by the vibration generating means (53) so that the seat (8) vibrates by that strength. If setting a suitable strength of vibration for reducing tiredness or suppressing an increase of tiredness and controlling vibration by the vibration generating means so that the seat vibrates by this strength in this way when tiredness of the seated person is detected, vibration of the seat by more than the necessary strength and thereby the seated person feeling uncomfortable can be avoided.

In this case, in a vehicle tiredness alleviating system according to a 32nd aspect of the present invention, if the vibration control means (780, 790) determines the strength of vibratian based on the tiredness degree calculated by the tiredness judging means (765, 770), it is possible to suitably set the strength of vibration so as to reduce tiredness of the seated person or suppress an increase in tiredness.

Further, in a vehicle tiredness alleviating system according to a 33rd aspect of the present invention, it is also possible to set the strength of vibration to a first predetermined strength when the tiredness degree is a first predetermined value to less than a second predetermined value and set the strength of vibration to a second predetermined strength higher than the first predetermined strength when the tiredness degree is the second predetermined value or more. By raising the strength of vibration when tiredness of a higher extent is detected from the seated person, it is possible to make the seat vibrate by a suitable strength in accordance with the tiredness degree of the seated person.

Further, in a vehicle tiredness alleviating system according to a 34th aspect of the present invention, the vibration control means (780, 790) controls the vibration generating means (53) so that the vibration is performed for a predetermined duration at a strength determined based on the tiredness degree when tiredness of the seated person is detected. Further, in a vehicle tiredness alleviating system according to a 35th aspect of the present invention, the predetermined duration is determined based on the tiredness degree. If vibrating the seat for the predetermined duration determined based on the tiredness degree, vibration of the seat continuously for more than the necessary time and thereby the seated person feeling uncomfortable can be avoided.

In this case, in a vehicle tiredness alleviating system according to a 36th aspect of the present invention, the vibration control means sets the predetermined duration of vibration to a first predetermined time when the tiredness degree is a third predetermined value to less than a fourth predetermined value and sets the predetermined duration to a second predetermined time longer than the first predetermined time when the tiredness degree is the fourth predetermined value or more. By setting the predetermined duration of vibration longer when tiredness of a higher extent is detected from a seated person, it is possible to vibrate the seat for a suitable duration in accordance with the tiredness degree of the seated person.

In a vehicle tiredness alleviating system according to a 37th aspect of the present invention, in the vehicle tiredness alleviating system of the 27th aspect, the seated person information detecting means detects at least one of bio information, motion information, and seated duration of the seated person (7) as the seated person information. If judging whether or not the seated person is tired based on the bio information, motion information, and seated duration of the seated person, accurate judgment is possible.

Further, in a vehicle tiredness alleviating system according to a 38th aspect of the present invention, in a vehicle tiredness alleviating system of the 30th aspect, the seated person information detecting means detects a heartbeat signal from the seated person (7) as the seated person information, and the tiredness judging means (765, 770) calculates the tiredness degree based on the heartbeat signal. In particular, in a vehicle tiredness alleviating system according to a 39th aspect of the present invention, the tiredness judging means (765, 770) can calculate a normal number of heartbeats and current number of heartbeats of the seated person (7) from the heartbeat signal and calculate the ratio by which the current number of heartbeats falls compared with the normal number of heartbeats as the tiredness degree. Since the heartbeat signal can be relatively easily detected from a seated person, if calculating the tiredness degree based on the heartbeat signal, it is possible to simply and more accurately calculate the tiredness degree.

Still further, in a vehicle tiredness alleviating system according to a 40th aspect of the present invention, the means for judging the tiredness degree of the passenger is comprised of a pulse wave sensor provided at a driver's seat for detecting a pulse wave of the driver, a vibration sensor provided at the driver's seat for detecting vibration of the driver's seat, a pulse wave extracting means for extracting a pulse wave component based on a detection signal of the pulse wave sensor and a detection signal of the vibration sensor, and a tiredness judging means for judging tiredness of the driver based on a pulse wave component extracted by the pulse wave extracting means and outputting a command signal based on the judged tiredness to an air-conditioning system unit of the vehicle air-conditioning system.

In the vehicle tiredness alleviating system according to a 40th aspect of the present invention, the detection signal of the pulse wave sensor also includes a noise component (vibration component) due to bodily movement by the driver itself and bodily movement of the driver occurring along with driving of the vehicle in addition to the pulse wave component of the driver. On the other hand, the detection signal of the vibration sensor is comprised of only the vibration component due to bodily movement due to the driver himself and bodily movement of the driver occurring along with driving of the vehicle and does not include the pulse wave component of the driver. The pulse wave extracting means captures the vibration component included in the detection signal of the vibration sensor as corresponding to the noise component (vibration component) included in the detection signal of the pulse wave sensor and performs processing for extracting only the pulse wave component from the pulse wave component and noise component (vibration component) included in the detection signal of the pulse wave sensor. The tiredness judging means judges tiredness of the driver based on the pulse wave component extracted by the pulse wave extracting means. Further, the tiredness judging means outputs a command signal corresponding to the judged tiredness to the air-conditioning system unit. The air-conditioning system unit controls air-conditioning in accordance with the command signal. When the command signal instructs "control of air-conditioning for times of tiredness", it sets the air vent temperature to a higher temperature than the current temperature so as to recover from tiredness in accordance with the tiredness degree, while when the command signal instructs "control of air-conditioning for times of no tiredness", it continues the normal control of the air-conditioning.

Therefore, according to the vehicle tiredness alleviating system of the 40th aspect of the invention, higher precision judgment of tiredness becomes possible and therefore the driver does not become numbed and the control of the air-conditioning for reducing tiredness can work more effectively.

In a vehicle tiredness alleviating system according to a 41st aspect of the present invention, in the vehicle tiredness alleviating system of the 40th aspect, the pulse wave sensor is provided at a portion of a high seating pressure at the driver's seat and the vibration sensor is provided at a portion of a low seating pressure at the driver's seat.

In the vehicle tiredness alleviating system according to a 41st aspect of the present invention, by setting the pulse wave sensor at a portion of a high seating pressure at the driver's seat, the level of the pulse wave component in the detection signal of the pulse wave sensor becomes large. This is because at a portion of a high seating pressure, the veins are constricted at the same time as the measurement of the blood pressure and the blood flow hits the constricted veins so the vibration and noise occurring at that time become large. Therefore, the noise component in the detection signal of the pulse wave sensor becomes smaller than the pulse wave component of the signal component. Further, by providing the vibration sensor at a portion of a low seating pressure at the driver's seat, it is possible to prevent the detection signal of the vibration sensor from including a pulse wave component becoming noise for the detection signal.

Therefore, according to a vehicle tiredness alleviating system according to the 41st aspect of the present invention, the detection signal of the pulse wave sensor becomes mainly the pulse wave component, while the detection signal of the vibration sensor becomes only the vibration component, so it is possible to extract a high precision pulse wave component at the pulse wave extracting means.

BRIEF DESCRIPTION OF THE DRAWINGS

These and other objects and features of the present invention will become clearer from the following description of the preferred embodiments given with reference to the attached drawings, wherein:

FIG. 21 is a view of the overall configuration of a vehicle tiredness alleviating system according to a seventh embodiment of the present invention.

DESCRIPTION OF THE PREFERRED EMBODIMENTS

Preferred embodiments of the present invention will be described in detail below while referring to the attached figures.

First Embodiment

Figure 1:
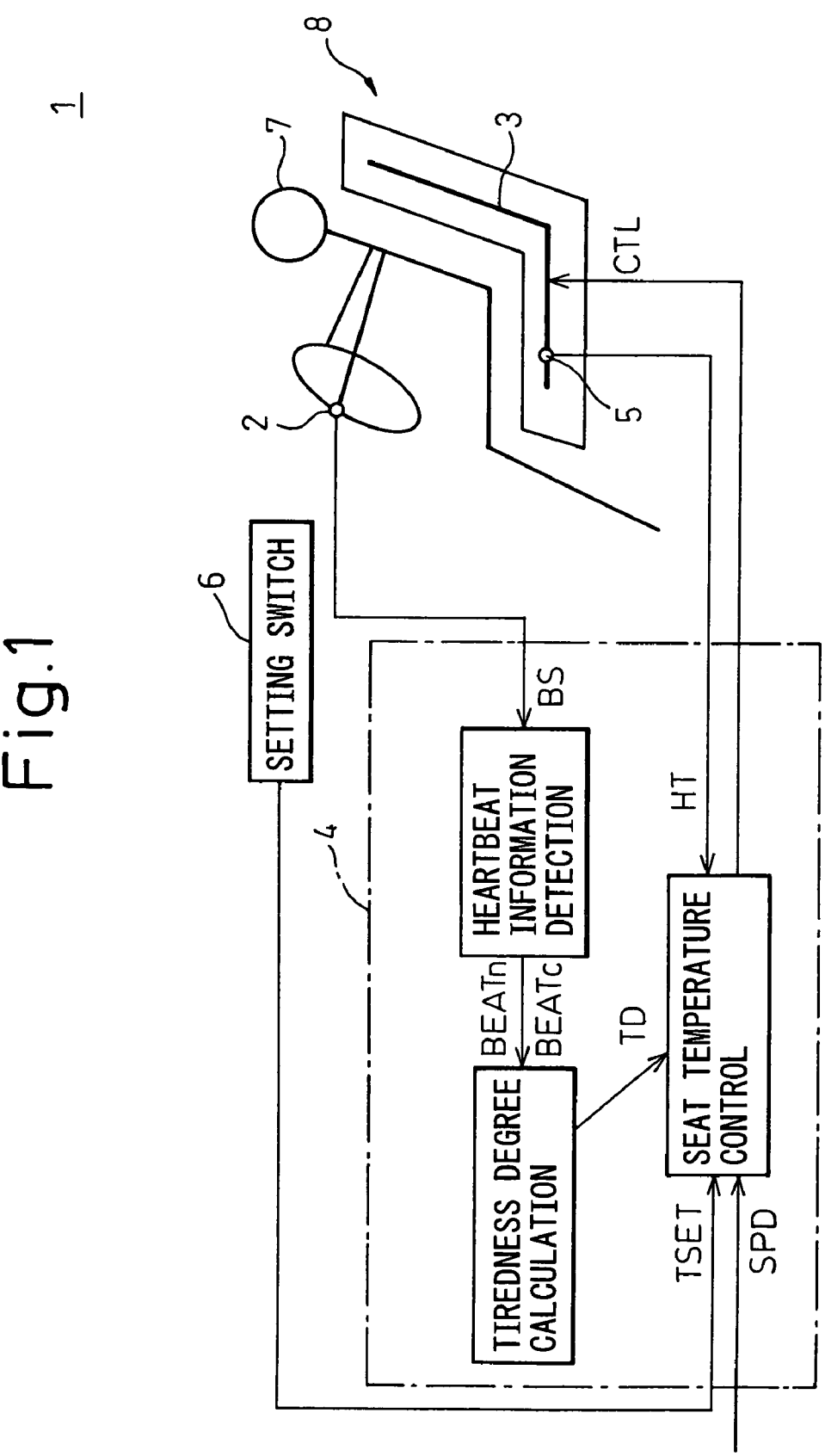
FIG. 1 is a view of the overall configuration of a vehicle tiredness alleviating system according to a first embodiment of the present invention.

The vehicle tiredness alleviating system according to a first embodiment of the present invention is mounted in a vehicle and adjusts the temperature of the driver's seat. FIG. 1 shows the overall configuration of the vehicle tiredness alleviating system 1. The steering wheel of the vehicle has a metal electrode 2 for detecting heartbeat information BS from a driver (seated person) 7 sitting in the driver's seat 8 built into it. The driver's seat 8 has an electric heater 3 for heating the seat built into it. The driver 7 can switch the electric heater 3 between "strong" and "weak" by a setting switch 6 provided in the passenger compartment.

A seat temperature adjustment ECU 4 receives a signal showing the temperature setting TSET based on a setting by the driver from the setting switch 6, receives a signal HT showing the temperature of the electric heater 3 from the heater temperature sensor 5, and ordinarily outputs a control signal CTL for turning the electric heater 3 ON/OFF so that the heater temperature is adjusted to the temperature setting TSET based on the temperature setting TSET and heater temperature HT. The temperature setting TSET when the driver selects "strong" by the setting switch 6 is for example 50° C., while the temperature setting TSET when selecting "weak" is for example 40° C. Further, the temperature of the seat 8 when the electric heater 3 is 40° C. is about 33° C.

The seat temperature adjustment ECU 4 further detects the tiredness of the driver based on the heartbeat information BS of the driver detected by the metal electrode 2 and, when judging that the driver is tired, performs control based on the tiredness degree with priority over the above normal control.

The seat temperature adjustment ECU 4 is provided inside it with a microcomputer comprised of a not shown CPU, ROM, RAM, etc. and is configured to operate by the supply of power from a car battery (not shown) when the ignition switch (not shown) of the vehicle is ON. The seat temperature adjustment ECU 4 operates as follows by execution of a program stored in the ROM.

When a predetermined time (for example 5 minutes) elapses from when the driver turns the ignition switch of the vehicle ON and initially starts driving, the heartbeat signal BS of the driver 7 is detected by the metal electrode 2 for a predetermined time from that time (for example, 10 minutes) and the normal number of heartbeats BEATn of the driver 7 at the time of driving is calculated from heatbeat information obtained for a predetermined time. After this, the heartbeat signal BS of the driver 7 continues to be detected and is stored. Every two minutes, the current number of heartbeats BEATc is calculated from the stored heartbeat information. The ratio by which the current number of heartbeats BEATc falls from the normal number of heartbeats BEATn is calculated as the tiredness degree TD of the driver 7.

When the tiredness degree TD exceeds a predetermined value, it is judged that the driver 7 is tired, the target temperature and heating time of the electric heater 3 are determined based on the value of the tiredness degree TD, and a control signal CTL is output to the electric heater 3 so that the heating at the target temperature is executed temporarily for the determined heating time.

On the other hand, when the tiredness degree TD is less than a predetermined value, ordinary control is executed and thereby a control signal CTL is output to the electric heater 3 so that the heater temperature is continuously maintained at the temperature setting TSET in accordance with the setting by the driver 7.

Figure 2:
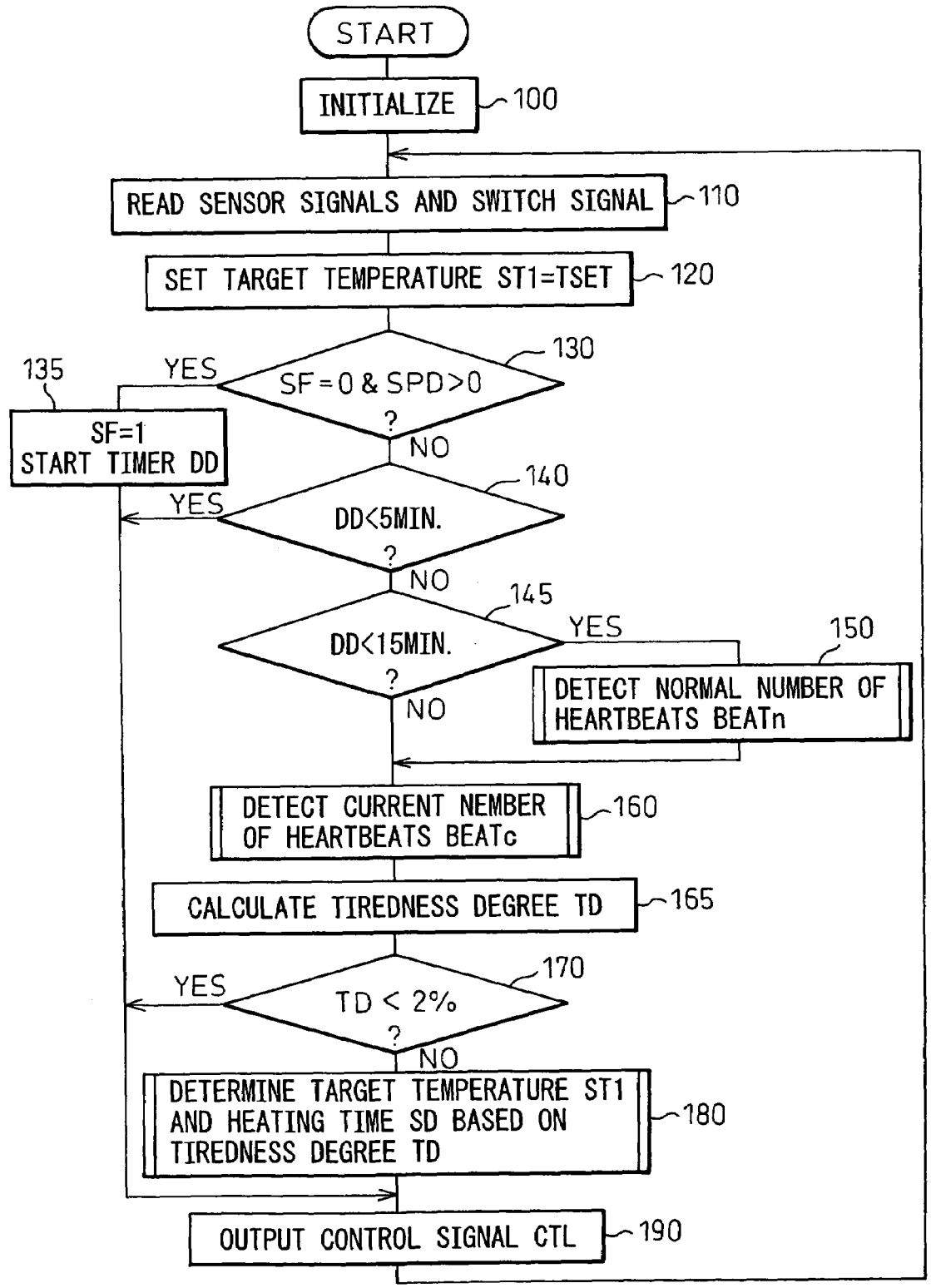
FIG. 2 is a flow chart of a main routine of processing for control executed by a seat temperature adjustment ECU.

FIG. 2 shows the routine of processing to be executed by the seat temperature adjustment ECU 4. The seat temperature adjustment ECU 4 starts operation when the ignition switch of the vehicle is turned ON and, at step 100, initializes the stored content of a data processing memory (RAM) etc. At this time, the operation start flag SF and temporary heating time SD used at the later steps are initialized to "0".

The operation start flag SF is set to "1" when driver turns the ignition switch of the vehicle ON and initially starts driving and continues to be set to "1" after that until the ignition switch is turned OFF and the seat temperature adjustment ECU 4 ends its operation. Further, the temporary heating time SD expresses the heating duration when temporarily heating the seat based on the tiredness degree and is set at the later step 180.

Next, at step 110, the various sensor signals and switch signal are read. At this time, the vehicle speed signal SPD from the speed sensor (not shown), the temperature setting signal TSET from the setting switch 6, the heater temperature signal HT from the heater temperature sensor 5, etc. are read.

At step 120, the target temperature ST1 of the electric heater 3 is set to the temperature setting TSET.

At step 130, it is judged if the condition "SF=0 & SPD>0" is satisfied. When it is judged "YES", it is judged that the driver 7 has started driving. At step 135, the operation start flag SF is set to "1" and the timer DD is started. The timer DD is used to measure the time elapsed from when the driver turns the ignition switch ON and initially starts driving. After step 135 finishes being executed, the routine proceeds to step 190.

When it is judged "NO" at step 130, the routine proceeds to step 140, where it is judged if the timer DD shows less than 5 minutes. When it is judged "YES", the routine proceeds to step 190.

When it is judged NO at step 140, the routine proceeds to step 145, where it is judged if the timer DD shows less than 15 minutes. When it is judged "YES", the routine proceeds to step 150, where the normal number of heartbeats BEATn is detected, then the routine proceeds to step 160. Details of the processing for detection of the normal number of heartbeats BEATn at step 150 will be described later. When it is judged "NO" at step 145, the routine bypasses step 150 and proceeds to step 160.

At step 160, the current number of heartbeats BEATc is detected. Details of the processing will be explained later. At step 165, the tiredness degree TD of the driver is calculated based on the normal number of heartbeats BEATn and the current number of heartbeats BEATc. Specifically, when the driver becomes tired, the number of heartbeats tends to fall, so the following equation is used to calculate the ratio by which the current number of heartbeats BEATc falls from the normal number of heartbeats BEATn as the tiredness degree:

$$TD=(BEATn-BEATc)/BEATn$$

Next, at step 170, it is judged if the tiredness degree TD is less than a first predetermined value (for example, 2%). When it is judged "YES", it is judged that the driver is not tired and the routine proceeds to step 190 as it is.

When it is judged "NO" at step 170, the routine proceeds to step 180, where the heater target temperature ST1 and heating time SD for temporarily heating the seat 8 are determined based on the value of the tiredness degree TD, then the routine proceeds to step 190. Details of the processing at step 180 will be explained below.

At step 190, a control signal CTL is output to the electric heater 3 based on the target temperature ST1 set at step 120 or step 180 and the heating time SD set at step 180. Specifically, when the temporary heating time SD is larger than 0, the electric heater 3 is controlled so as to temporarily maintain the target temperature ST1 for the heating time SD. When the heating time SD ends, the heating is stopped. When the heating time SD is 0, the electric heater 3 is continuously controlled so as to maintain the target temperature ST1.

Further, when controlling the electric heater 3 to the target temperature ST1, if the heater temperature HT is lower than the target temperature ST1, the electric heater 3 is turned ON by the control signal CTL, while if the heater temperature HT is the target temperature ST1 or more, the electric heater 3 is turned OFF by the control signal CTL.

After execution of step 190, the routine returns to step 110, where the following steps are repeatedly executed. Since a time of about 2 minutes is required for the processing for detecting the current number of heartbeats BEATc at step 160, after the execution of the detection of the normal number of heartbeats at step 150, that is, after about 15 minutes have elapsed from the start of driving by the driver, steps 110 to 190 are executed at a cycle of about 2 minutes.

Therefore, when tiredness of the driver 7 is detected (when the tiredness degree TD is more than 2%), the heating is repeated intermittently in cycles of about 2 minute until the tiredness degree TD is reduced to less than 2%.

Figure 3:
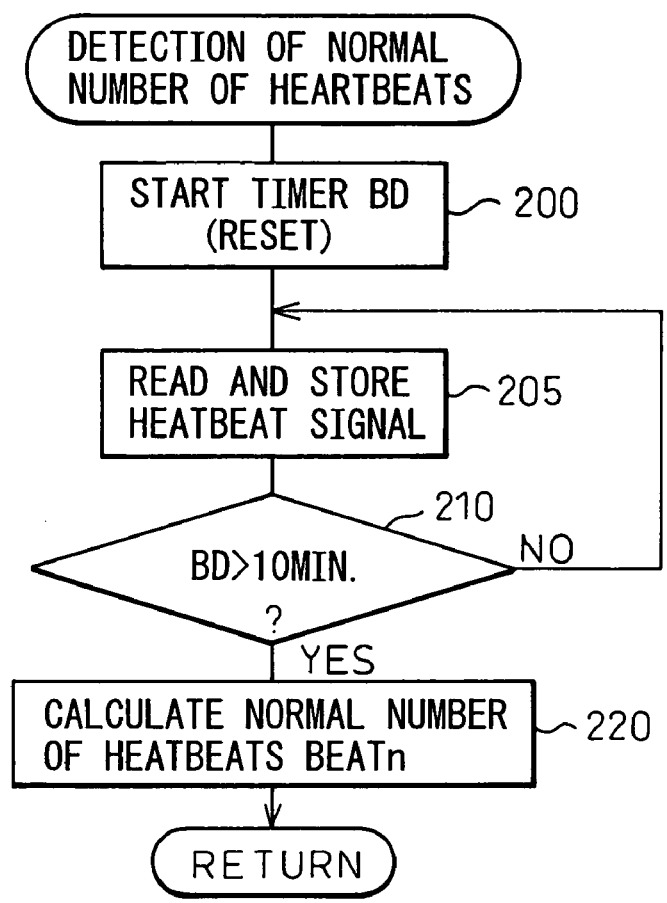
FIG. 3 is a flow chart of processing for detection of the normal number of heartbeats executed at step 150 of FIG. 2.

FIG. 3 shows the routine of the processing for detection of the normal number of heartbeats executed at step 150. First, at step 200, the timer BD is started. At step 205, the heartbeat signal BS of the driver is read from the metal electrode 2 and stored. At this time, the heartbeat signal BS is sampled at a predetermined frequency (for example, at least 100 Hz), filtered by a for example 6 to 30 Hz bandpass filter, then stored. At step 210, it is judged if the timer BD shows more than 10 minutes. When it is judged "NO", the routine returns to step 205, where the heartbeat signal is read and stored again. By this, the heartbeat signal for 10 minutes is stored. In this case, however, the time for storing the heartbeat signal is not limited to 10 minutes. It is possible to set the time so that the data necessary for accurately calculating the normal number of heartbeats BEATn of the driver at the time of driving can be obtained.

Figure 4:
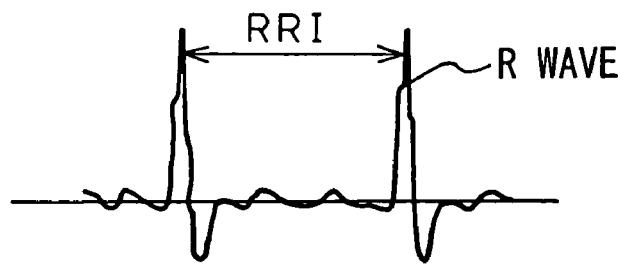
FIG. 4 is a view explaining a time interval (RRI) of a heartbeat signal.

When it is judged "YES" at step 210, the routine proceeds to step 220, where the normal number of heartbeats BEATn is calculated from the heartbeat data for 10 minutes. Specifically, as shown in FIG. 4, the RRI data is calculated using the wave exceeding a predetermined threshold as the R wave and the time interval (heartbeat interval) as RRI. The average value RRIavg of the heartbeat interval RRI is calculated from the calculated RRI data and this is used to find the average normal number of heartbeats BEATn at the time of driving by the following equation:

$$BEATn = 60/RRIavg$$

After step 220 finishes being executed, the main routine is returned to.

Figure 5:
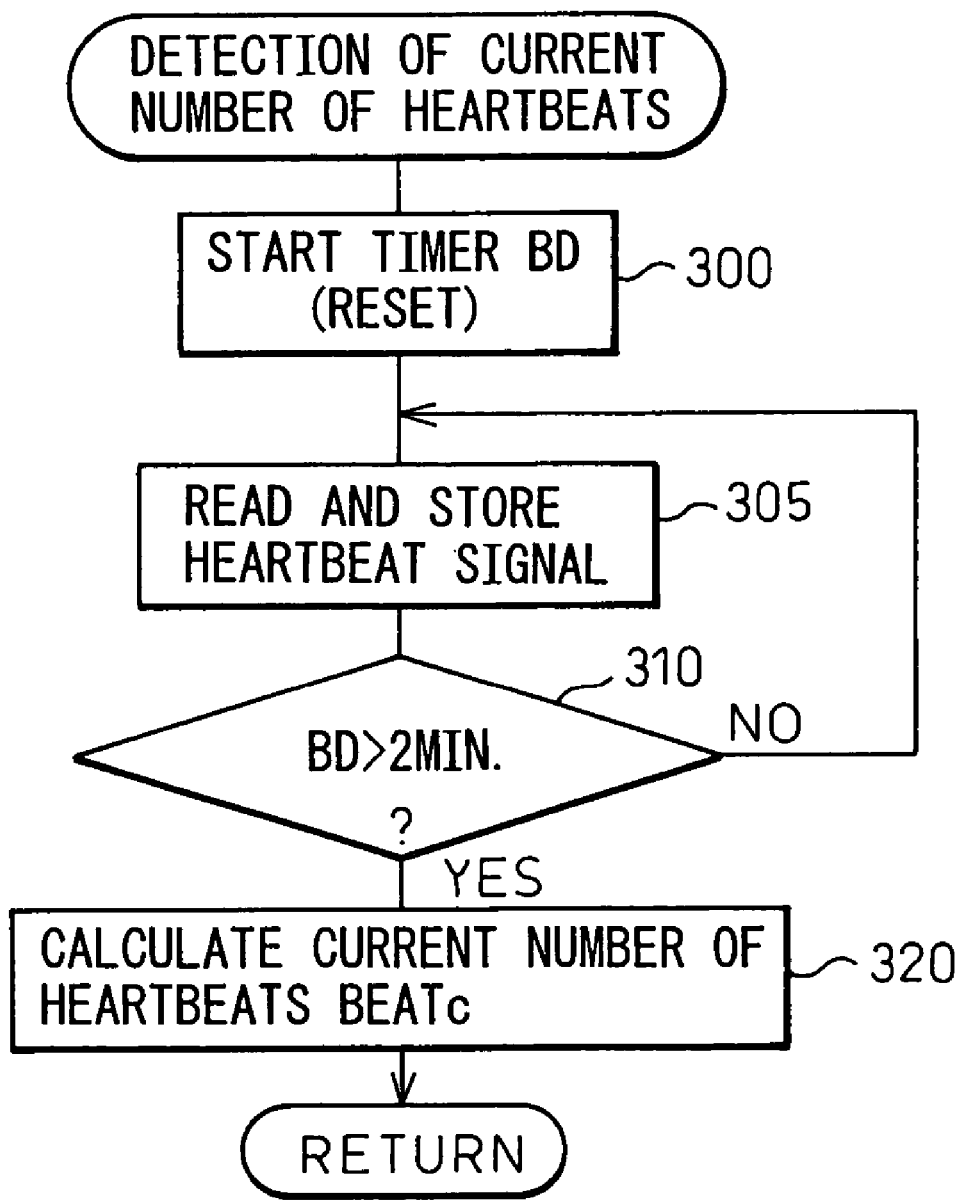
FIG. 5 is a flow chart of processing for detection of the current number of heartbeats executed at step 160 of FIG. 2.

FIG. 5 shows the routine of the processing for detection of the current number of heartbeats executed at step 160 shown in FIG. 2. First, at step 300, the timer BD is started. At step 305, in the same way as step 205, the heartbeat signal BS of the driver is read from the metal electrode 2 and stored. At step 310, it is judged if the timer BD shows more than 2 minutes. When it is judged "NO", the routine returns to step 305, where the heartbeat signal BS is read and stored again. In this way, the heartbeat signal BS of 2 minutes is stored. In this case, however, the time for storing the heartbeat signal BS is not limited to 2 minutes. The time can be set to a time where the data necessary for accurately calculating the current number of heartbeats BEATc of the driver can be obtained.

When it is judged "YES" at step 310, the routine proceeds to step 320, where the current number of heartbeats BEATc is calculated from the heartbeat data of 2 minutes in the same way as step 220. After step 320 finishes being executed, the main routine is returned to.

Figure 6:
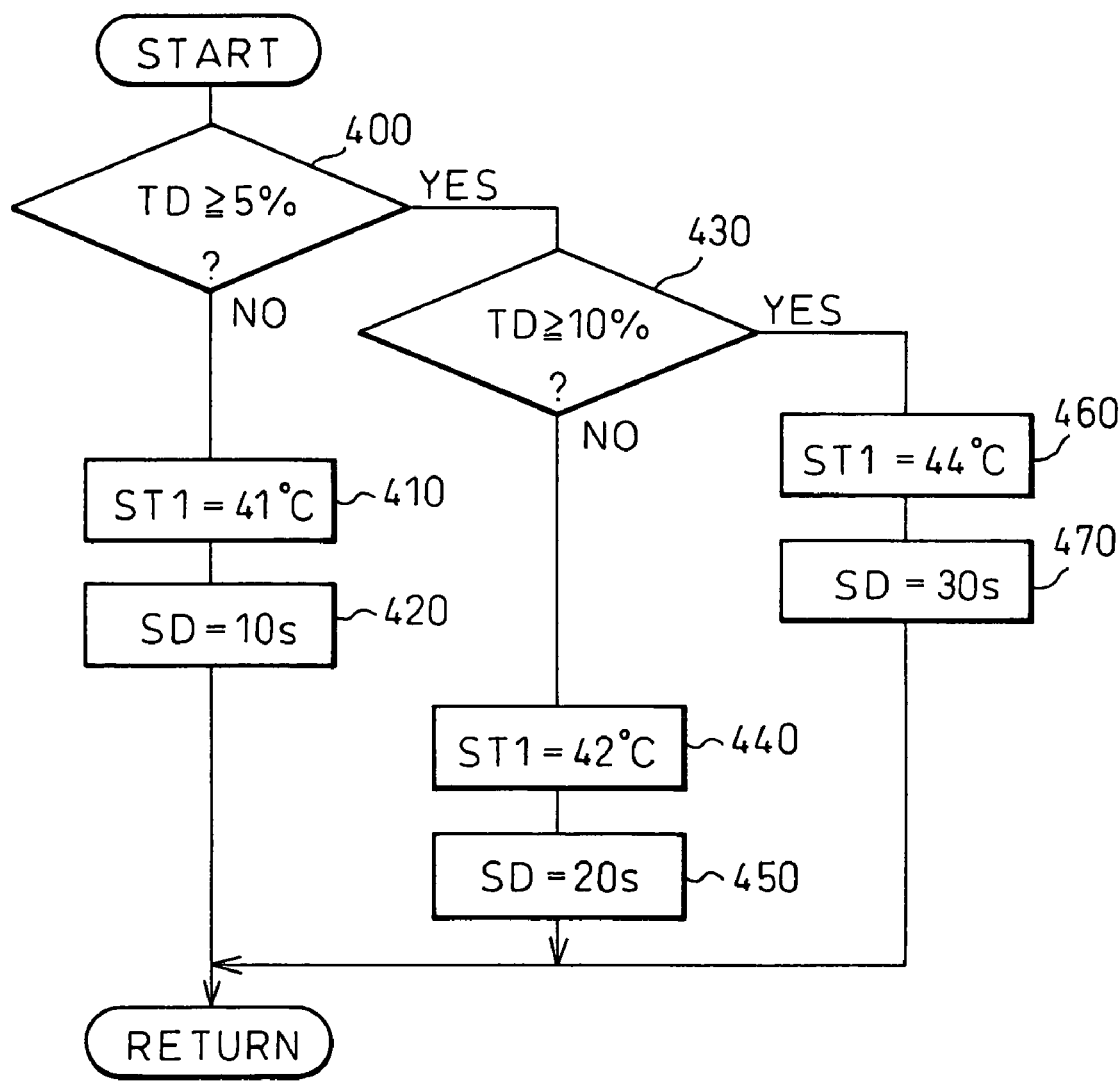
FIG. 6 is a flow chart of processing for determining the target temperature and heating time based on the tiredness degree executed at step 180 of FIG. 2.

FIG. 6 shows the routine of the processing for determining the target temperature ST1 and heating time SD based on the tiredness degree TD executed at step 180 shown in FIG. 2. First, at step 400, it is judged if the tiredness degree TD is a second predetermined value (for example, 5%) or more. If it is judged "NO", that is, if the tiredness degree TD is 2% to less than 5%, it is judged that the tiredness is small and the routine proceeds to step 410, where the heater target temperature ST1 is set to for example 41° C. so that the seat temperature becomes a temperature (for example, 34° C.) about the same as human skin temperature. Further, at step 420, the heating time SD is set relatively short, for example, 10 seconds. After this, the main routine is returned to.

On the other hand, when it is judged "YES" at step 400, the routine proceeds to step 430, where it is judged if the tiredness degree TD is more than a predetermined value (for example, 10%) larger than the second predetermined value (5%). When it is judged "NO", that is, when the tiredness degree TD is 5% to less than 10%, it is judged that the tiredness is a medium extent and the routine proceeds to step 440, where the heater target temperature ST1 is set to for example 42° C. so that the seat temperature becomes a temperature slightly higher (for example 35° C.) than human skin temperature. Further, at step 450, the heating time SD is set slightly long, for example, to 20 seconds. After this, the main routine is returned to.

When it is judged "YES" at step 430, that is, when the tiredness degree TD is 10% or more, it is judged that the tiredness is large and the routine proceeds to step 460, where the heater target temperature ST1 is set to for example 44° C. so that the seat temperature becomes a further higher temperature (for example, 37° C.). Further, at step 470, the heating time SD is set further longer, for example, to 30 seconds. After this, the main routine is returned to.

In this way, when the tiredness degree TD is less than 2%, the electric heater 3 is continuously controlled using the temperature setting TSET by the driver 7 as the target temperature. While the tiredness degree TD is 2% to less than 5%, heating for 10 seconds using 41° C. as the target temperature is intermittently repeated at cycles of about 2 minutes. While the tiredness degree TD is 5% to less than 10%, heating for 20 seconds using 42° C. as the target temperature is intermittently repeated at cycles of about 2 minutes. While the tiredness degree TD is more than 10%, heating for 30 seconds using 44° C. as the target temperature is intermittently repeated at cycles of about 2 minutes.

In this way, in the vehicle tiredness alleviating system of the present embodiment, when tiredness of the driver 7 is detected, the electric heater 3 is used to heat the seat 8, so it is possible to stimulate the veins of the driver 7 to expand them and promote the flow of blood. Due to this, the tiredness of the driver 7 is reduced or the increase of tiredness is suppressed. Further, the heating of the seat 8 in the case of detection of tiredness is performed at a suitable target temperature and heating time corresponding to the tiredness degree, so heating more than necessary and thereby the driver feeling uncomfortable or feeling hot can be avoided.

Further, the heartbeat signal can be detected simply compared with other bio information such as brain waves, so if using the ratio of the current number of heartbeats BEATc falling from the normal number of heartbeats BEATn as the tiredness degree TD of the driver, it is possible to calculate the tiredness degree relatively simply and accurately.

The metal electrode 2 in the present embodiment corresponds to the seated person information detecting means of the present invention, while the electric heater 3 corresponds to the heating means of the present invention. Further, steps 150 and 160 correspond to the seat person information detecting means of the present invention, steps 165 and 170 correspond to the tiredness degree judgement means of the, present invention while steps 180 and 190 correspond to the heating control means of the present invention. The heating time SD in the present embodiment corresponds to the predetermined duration of the present invention. The first predetermined value used at step 170 corresponds to the first predetermined value and third predetermined value of the present invention, while the second predetermined value used at step 400 corresponds to the second predetermined value and fourth predetermined value of the present invention.

Second Embodiment

Figure 7:
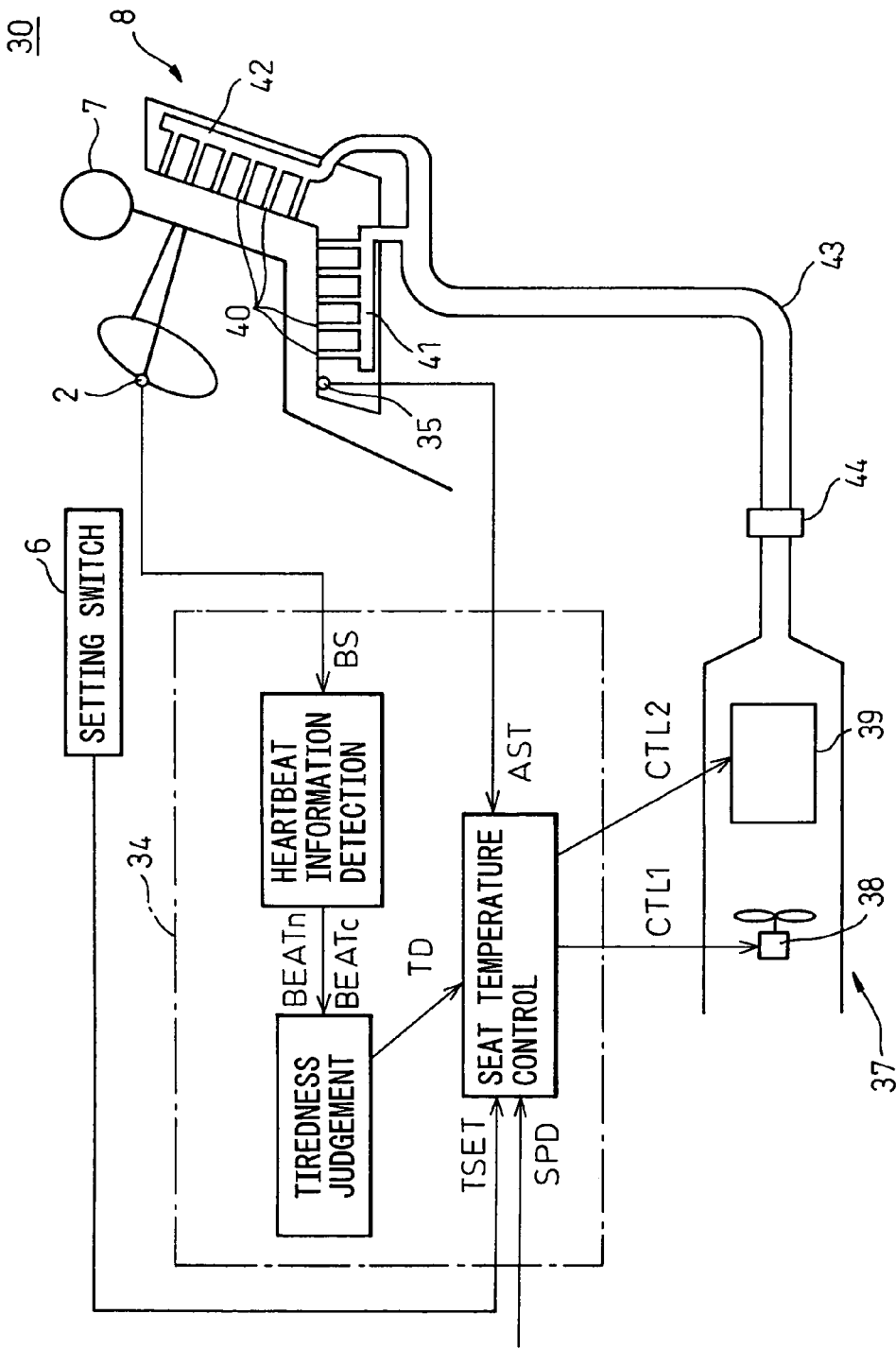
FIG. 7 is a view of the overall configuration of a vehicle tiredness alleviating system according to a second embodiment of the present invention.

The vehicle tiredness alleviating system according to a second embodiment of the present invention is mounted in a vehicle and adjusts the temperature of the driver's seat in the same way as the first embodiment. FIG. 7 shows the overall configuration of the vehicle tiredness alleviating system 30 of the present embodiment. The steering wheel of the vehicle has a metal electrode 2 for detecting the heartbeat information from the driver 7 of the driver's seat 8 built into it, while the driver's seat 8 has a plurality of air vents 40 formed at the seat part and back part.

These air vents 40 are communicated with a passage 41 formed inside the seat part and a passage 42 formed inside the back part. The passages 41 and 42 are connected through an air supply pipe 43 to a vent 44 of the seat heating and cooling system 37.

The seat heating and cooling system 37 air-conditions the seat 8 by supplying warm air or cool air from the vent 44 to the seat 8. The seat heating and cooling system 37 is provided with an electric fan 38 and a heating and cooling system 39. The heating and cooling system 39 is comprised of a device using heat generation and absorption based on the Peltier effect.

The driver 7 can switch the temperature settings of the seat air-conditioning by the seat heating and cooling system 37 among for example three "heating" levels, "neutral", and three "cooling" levels by a setting switch 6 provided inside the passenger compartment.

The seat temperature adjustment ECU 34 receives a signal showing the temperature setting TSET based on a setting by the driver from the setting switch 6, receives the signal showing the seat temperature AST from the seat temperature sensor 35 buried in the seat 8, and normally outputs the control signals CTL1 and CTL2 to the seat heating and cooling system 37 based on the temperature setting TSET and seat temperature AST so that the seat 8 is adjusted to the temperature setting TSET. The temperature setting TSET when the driver 7 selects "neutral" by the setting switch 6 is for example 34° C. When selecting "heating", this is set to a higher temperature, while when selecting "cooling", this is set to a lower temperature.

Further, the seat temperature adjustment ECU 34 detects tiredness of the driver based on the heartbeat information of the driver detected by the metal electrode 2 and, when judging that the driver is tired, controls the system based on the tiredness degree with priority over the above normal control.

The seat temperature adjustment ECU 34 is provided inside it with a microcomputer comprised of a not shown CPU, ROM, RAM, etc. When the ignition switch (not shown) of the vehicle is turned ON, it operates by power supplied from the car battery (not shown). The seat temperature adjustment ECU 34 operates as follows by executing a program stored in the ROM.

First, the tiredness degree TD of the driver is calculated based on the heartbeat information of the driver detected by the metal electrode 2 by a method similar to the first embodiment. When the tiredness degree TD is less than a predetermined value, normal control is executed. Due to this, the target vent temperature (target temperature) and flow rate of the air vented from the vent 44 of the heating and cooling system 37 are determined based on the temperature setting TSET. The control signals CTL1 and CTL2 are output to the electric fan 38 and heater/cooler 39 so that air is continuously vented by the target vent temperature and flow rate.

On the other hand, when the tiredness degree TD exceeds a predetermined value, the driver 7 is judged to be tired, the target vent temperature and flow rate are determined and the heating time is determined based on the temperature setting determined in accordance with the tiredness degree TD. Further, control signals CTL1 and CTL2 are output to the electric fan 38 and the heater/cooler 39 so that the heating at the target vent temperature is executed temporarily for the determined heating time.

In this case, however, when the temperature setting TSET set by the driver 7 is higher than the temperature setting corresponding to the tiredness degree TD, the system is controlled so that air is vented continuously by normal control based on the temperature setting TSET by the driver 7. Further, when the vented air becomes cool air, that is, when the higher (not lower) of the temperature setting corresponding to the tiredness degree TD and the temperature setting TSET by the driver 7 is lower than the seat temperature AST, the venting of air is stopped.

Figure 8:
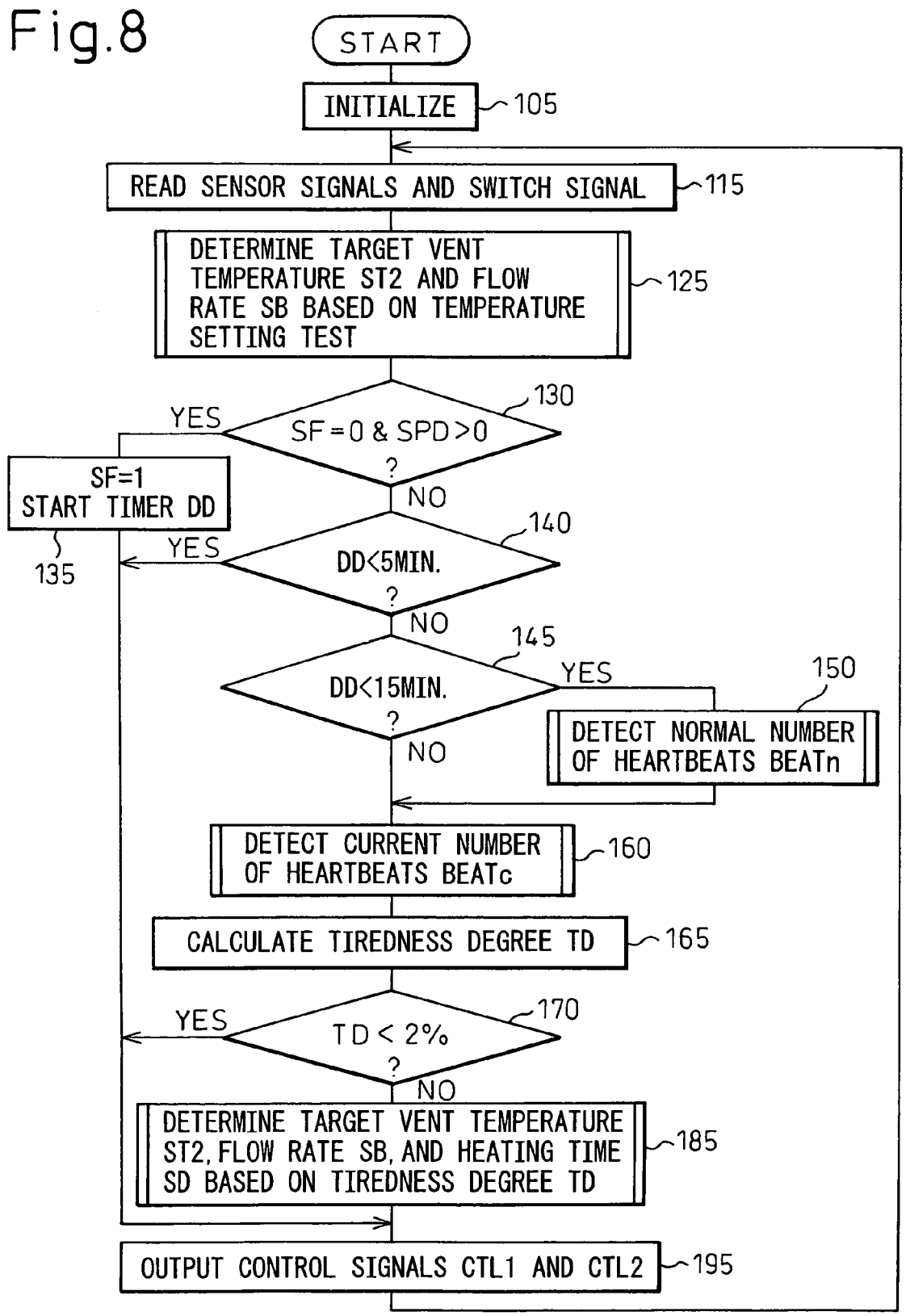
FIG. 8 is a flow chart of the main routine for processing for control executed by the seat temperature adjustment ECU.

FIG. 8 shows the routine of the processing executed by the seat temperature adjustment ECU 34. The seat temperature adjustment ECU 34 starts operating when the ignition switch of the vehicle is turned ON. First, at step 105, the stored content of the data processing memory (RAM) is initialized. At this time, the operation start flag SF and the temporary heating time SD used at later steps are initialized. The operation start flag SF is set and used in the same way as the first embodiment. Further, the temporary heating time SD expresses the heating duration when heating a seat by venting warm hot temporarily based on the tiredness degree and is set at the later step 185.

Next, at step 115, the various sensor signals and switch signal are read. At this time, the vehicle speed signal SPD from the speed sensor (not shown), the seat temperature signal AST from the seat temperature sensor 35, the temperature setting signal TSET from the setting switch 6, etc. are read.

At step 125, the target vent temperature ST2 and flow rate SB are determined based on the temperature setting TSET. Specifically, the vent temperature required for making the seat temperature approach the temperature setting TSET is calculated as the target vent temperature ST2 based on the temperature setting TSET and seat temperature AST.

Next, steps 135 and 170 are executed in the same way as the first embodiment. After step 135 finishes being executed, the routine proceeds to step 195. When it is judged YES at step 140 and when it is judged YES at step 170, the routine proceeds to step 195. Further, when it is judged NO at step 170, the routine proceeds to step 185.

At step 185, the target vent temperature ST2, flow rate SB, and heating time SD are determined based on the value of the tiredness degree TD, then the routine proceeds to step 195. Details of the processing at step 185 will be explained later.

At step 195, control signals CTL1 and CTL2 are output to the electric fan 38 and heater/cooler 39 based on the target vent temperature ST2 and flow rate SB determined at step 125 or step 185 and the heating time SD determined at step 185. Specifically, when the heating time SD is larger than 0, the control signals CTL1 and CTL2 are output so that air is temporarily vented by the target temperature ST2 and flow rate SB for the heating time SD, then the venting of air is stopped. When the heating time SD is 0, the control signals CTL1 and CTL2 are output so that the air is vented continuously at the target vent temperature ST2 and flow rate SB.

After the execution of step 195, the routine returns to step 115, where the following steps are repeatedly executed. After the execution of the processing for detection of the normal number of heartbeats BEATn at step 150, steps 115 to 195 are executed at cycles of about 2 minutes.

Figure 9:
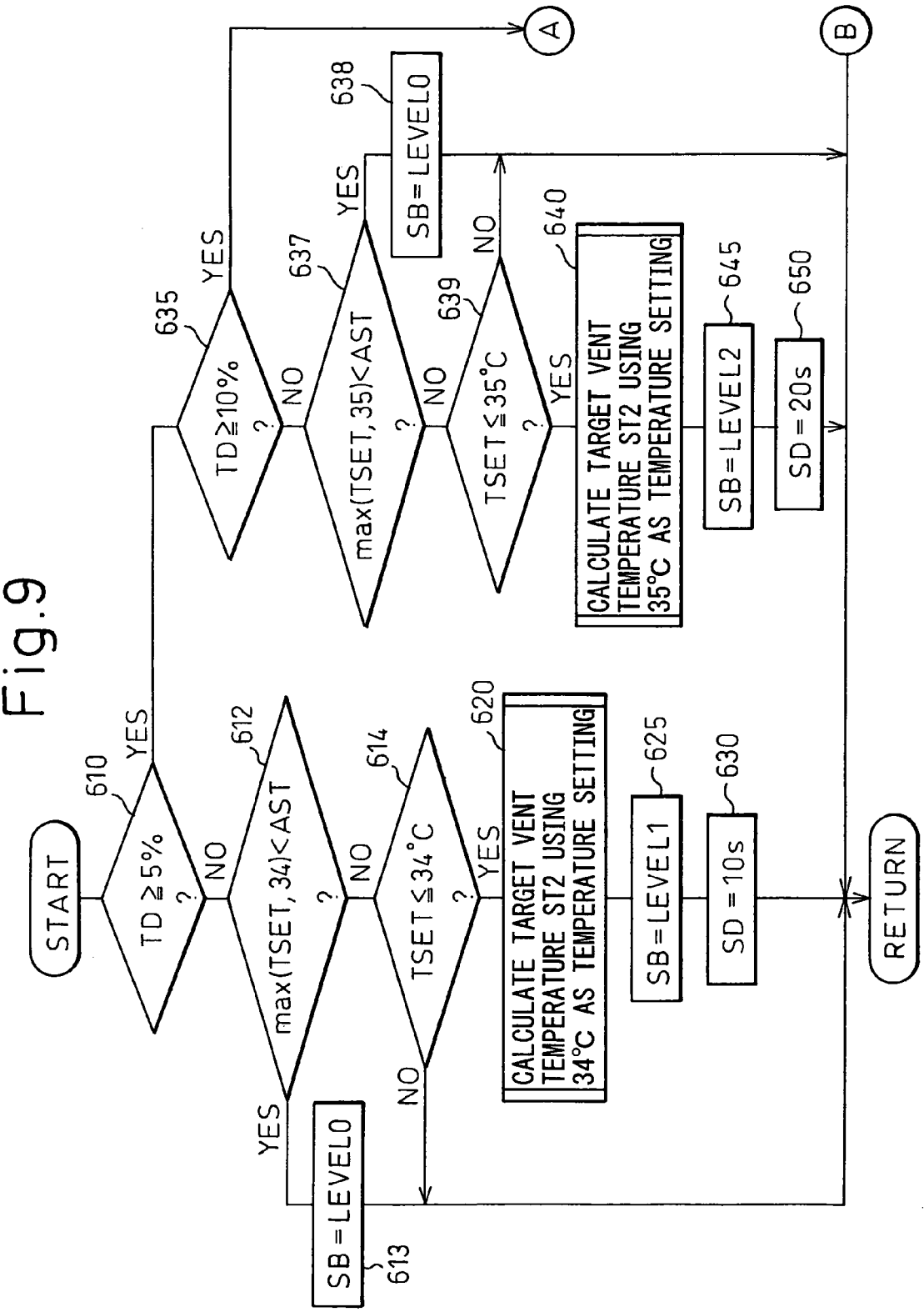
FIG. 9 is a flow chart of a first part of processing for determining a target vent temperature, flow rate, and heating time based on the tiredness degree executed at step 185 shown at FIG. 8.
Figure 10:
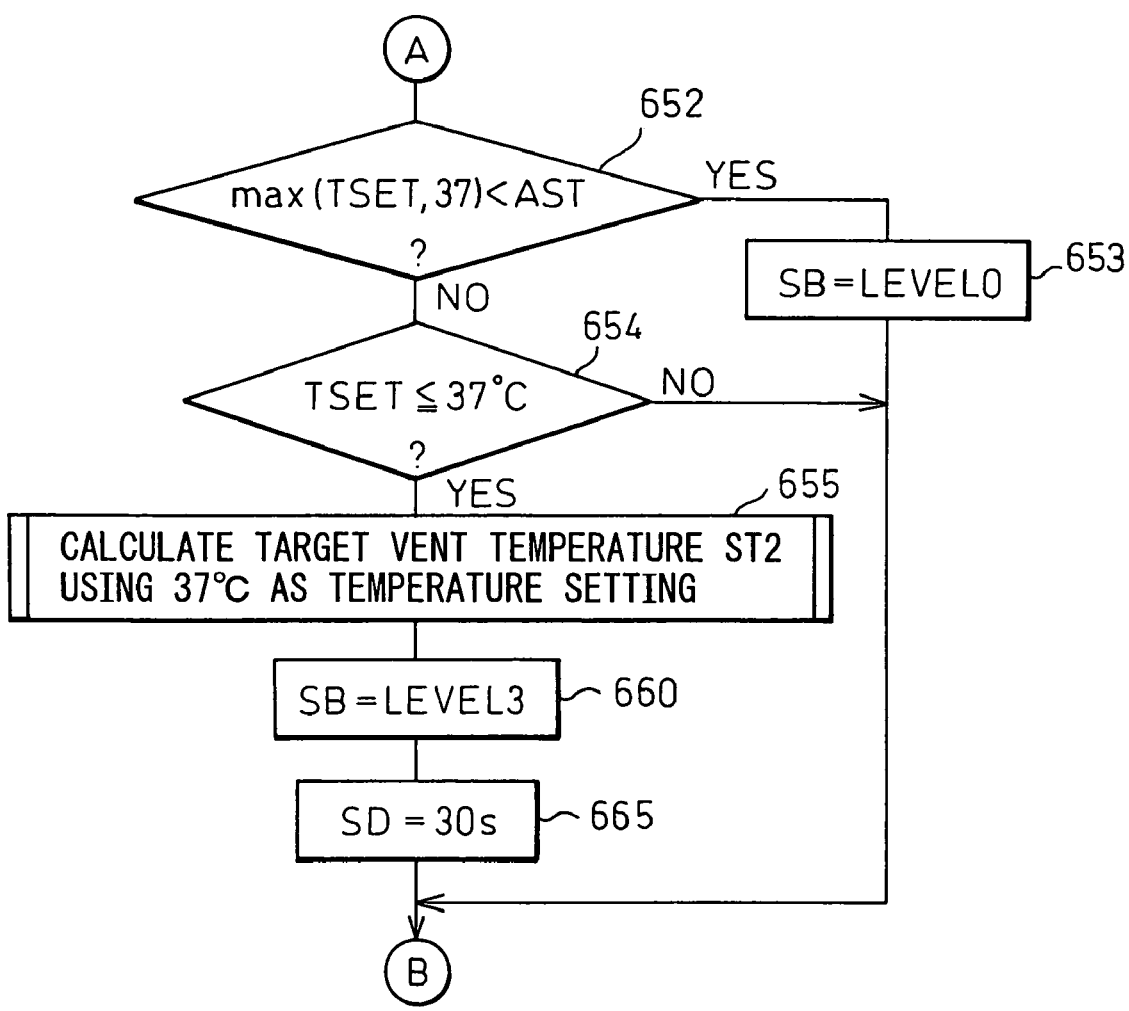
FIG. 10 is a flow chart of a second part of processing for determining a target vent temperature, flow rate, and heating time based on the tiredness degree executed at step 185 shown at FIG. 8.

FIG. 9 and FIG. 10 show the routine of the processing for determining the target vent temperature ST2, flow rate SB, and heating time SD based on the tiredness degree TD executed at step 185. Further, at step 610, it is judged if the tiredness degree TD is 5% or more. If it is judged "NO", that is, if the tiredness degree TD is 2% to less than 5%, the routine proceeds to step 612, where it is judged if the higher (not lower) of the temperature setting TSET and 34° C. is lower than the seat temperature AST. If it is judged "YES", the routine proceeds to step 613, where the flow rate SB is set to LEVEL 0 where air is not vented, then the main routine is returned to.

When it is judged "NO" at step 612, the routine proceeds to step 614, where it is judged if the temperature setting TSET is 34° C. or less. If it is judged "NO", the main routine is returned to.

When it is judged "YES" at step 614, the routine proceeds to step 620, where the target vent temperature ST2 is calculated using 34° C. as the temperature setting, then the routine proceeds to step 625, where the flow rate SB is set at the minimum flow rate constituted by LEVEL 1. Further, at step 630, the heating time SD is set to 10 seconds. After this, the main routine is returned.

On the other hand, when it is judged "YES" at step 610, the routine proceeds to step 635, where it is judged if the tiredness degree is 10% or more. When it is judged "NO", that is, when the tiredness degree TD is 5% to less than 10%, the routine proceeds to step 637, where it is judged if the higher (not lower) of the temperature setting TSET and 35° C. is lower than the seat temperature AST. When it is judged "YES", the routine proceeds to step 638, where the flow rate SB is set to LEVEL 0 and the main routine is returned to.

When it is judged "NO" at step 637, the routine proceeds to step 639, where it is judged that the temperature setting TSET is 35° C. or less. When it is judged "NO", the main routine is returned to.

When it is judged "YES" at step 639, the routine proceeds to step 640, where the target vent temperature ST2 is calculated using 35° C. as the temperature setting, then the routine proceeds to step 645, where the flow rate SB is set to LEVEL 2 one step higher than LEVEL 1. Further, at step 650, the heating time is set to 20 seconds. After this, the main routine is returned to.

When it is judged "YES" at step 635, that is, when the tiredness degree TD is 10% or more, the routine proceeds to step 652, where it is judged if the higher (not lower) of the temperature setting TSET and 37° C. is lower than the seat temperature AST. When it is judged "YES", the routine proceeds to step 653, where the flow rate SB is set to LEVEL 0 and the main routine is returned to.

When it is judged "NO" at step 652, the routine proceeds to step 654, where it is judged if the temperature setting TSET is 37° C. or less. When it is judged "NO", the main routine is returned to.

When it is judged "YES" at step 654, the routine returns to step 655, where the target vent temperature ST2 is calculated using the temperature setting as 37° C., then the routine proceeds to step 660, where the flow rate SB is set to the LEVEL 3 one step higher than LEVEL 2. Further, at step 665, the heating time SD is set to 30 seconds. After this, the main routine is returned to.

When the tiredness degree of the driver 7 is 2% or more in this way, the target vent temperature ST2 and flow rate SB are set based on the temperature setting corresponding to the value of the tiredness degree TD, air is vented for the predetermined time SD by the target vent temperature ST2 and flow rate SB, and the system is controlled so that the venting of air is stopped after the elapse of a predetermined time. In actuality, the venting of air is repeated intermittently at cycles of about 2 minutes until the tiredness degree TD falls to less than 2%.

Even when the tiredness degree TD of the driver 7 is 2% or more, however, when the temperature setting TSET by the driver is higher than a temperature setting corresponding to the value of the tiredness degree TD, normal control is performed based on the temperature setting TSET by the driver.

Further, when the temperature setting used for calculation of the target vent temperature ST2, that is, the higher (not lower) of the temperature setting TSET by the driver and the temperature setting corresponding to the value of the tiredness degree TD, is lower than the seat temperature AST, air is vented for cooling the seat 8, so in this case, the flow rate SB is set to the LEVEL 0, whereby the venting of cool air is stopped. The venting of cool air is stopped continuously until the tiredness degree TD is reduced to less than 2%. In this way, the cool air cooling the body of the driver 7 and the flow of blood becoming poorer can be avoided.

In this way, in the vehicle tiredness alleviating system of the present embodiment, when tiredness of the driver 7 sitting at the driver's seat 8 is detected, air, not cool air, is vented by the seat heating and cooling system 37 from the seat 8 to the driver 7, so it is possible to expand the veins of the driver and promote the flow of blood. Due to this, tiredness of the driver is reduced or the increase of tiredness is suppressed. Further, the venting of air in this case is performed by a suitable vent temperature and heating time corresponding to the tiredness degree TD, so venting at a higher temperature or longer time than needed and thereby the driver feeling hot or feeling uncomfortable can be avoided.

The seat heating and cooling system 37 of the present embodiment corresponds to the heating means and cooling means of the present invention. Steps 185 and 195 of the present embodiment correspond to the heating control means and cooling control means of the present invention.

Other Embodiments

The present invention is not limited to the first embodiment and second embodiment explained above and can be modified in various way as follows.

In the first embodiment and second embodiment, the heartbeat signal from the driver was detected by a metal electrode built into the steering wheel, but it is also possible to directly attach the metal electrode to the driver and detect the heartbeat signal by this electrode. Further, the electrode is not limited to a metal electrode. It need only be a conductive one, for example, a gel-like conductive substrate electrode. Further, the heartbeat signal of the driver may also be detected by an ultrasonic sensor, acceleration sensor, etc. built into the seat.

In the first embodiment and second embodiment, tiredness was detected based on the drop in the number of heartbeats of the driver, but it is also possible to detect the tiredness based on the decline in the heartbeat intervals or amplitude of the heartbeat waveform. Further, it is also possible to detect tiredness based on other bio information in addition to heartbeat information. For example, it is possible to detect tiredness based on brain wave information, blood pressure information, skin electrical activity information, eyeball information (blinking, line of sight, etc.), or other bio signal or information relating to secretions (sweat, saliva, or other bio substances). When the driver is tired, an increase in alpha waves in the brain waves, a rise in blood pressure, etc. is seen. Further, the potential difference of the skin approaches 0, the opening or blinking of the eye becomes less frequent, and movement of the line of sight becomes slower. Further, secretion of sweat is reduced and the cortisole in the saliva is reduced.

Further, it is possible to detect tiredness based on the motion information of the driver, seated time information (seated duration), etc. rather than the bio information. When the driver is tired, he may be observed to exhibit motion such as movement of the upper torso front and back and laterally or lifting of the waist, so when such movement is detected, it is possible to judge that the driver is tired. When detecting tiredness based on the seated time information, for example, when the seated duration exceeds one hour, the driver can be judged to be tired. After this, when the seated duration exceeds a predetermined value (for example, two hours), it is possible to judge that the tiredness has increased.

Further, to more accurately calculate the tiredness of the driver, it is also possible to use the bio information, motion information, and seated time information combined.

In the first embodiment, an electric heater was used as the heating means of the driver's seat, but the invention is not limited to this. It is also possible to use a system for blowing warm air to the driver's seat. Further, it is also possible to use a heating system utilizing a medium generating heat by a chemical change. The warm air blowing system can be realized by a system replacing the heater/cooler of the heating and cooling system in the second embodiment with a heater for only heating. When using a warm air blowing system as the heating means, when heating in accordance with the tiredness, warm air of the target vent temperature calculated based on the temperature setting corresponding to the tiredness is vented for the heating time determined in accordance with the tiredness for heating. When the heating is finished, it is possible to stop the warm air or switch to ventilation.

In the first embodiment, when tiredness of the driver 7 was detected, the target temperature ST1 was set based on the tiredness degree TD regardless of whether the user set "weak" or "strong", but when the user sets "strong", it is also possible to set the target temperature ST1 to the temperature setting TSET (50° C.) even when tiredness is detected. Further, when the user sets "strong", it is possible to not only set the target temperature ST1 to 50° C. in this way, but also to perform normal control when "strong" is set even when tiredness is detected and continuously heat the seat while setting the heater target temperature to 50° C.

In the second embodiment, when venting air for a predetermined time by a vent temperature calculated in accordance with the tiredness degree, the venting of air was stopped after the elapse of a predetermined time, but it is also possible to vent air at a target vent temperature calculated based on the temperature setting of the driver after the elapse of a predetermined time. Further, in the second embodiment, when venting air at the target vent temperature and cool air is vented, the venting of the cool air is continuously stopped, but it is also possible to stop venting of the cool air for a predetermined time and vent air at a target vent temperature calculated based on the temperature setting of the driver or a target vent temperature calculated in accordance with the tiredness degree after the elapse of this predetermined time.

Figure 11:
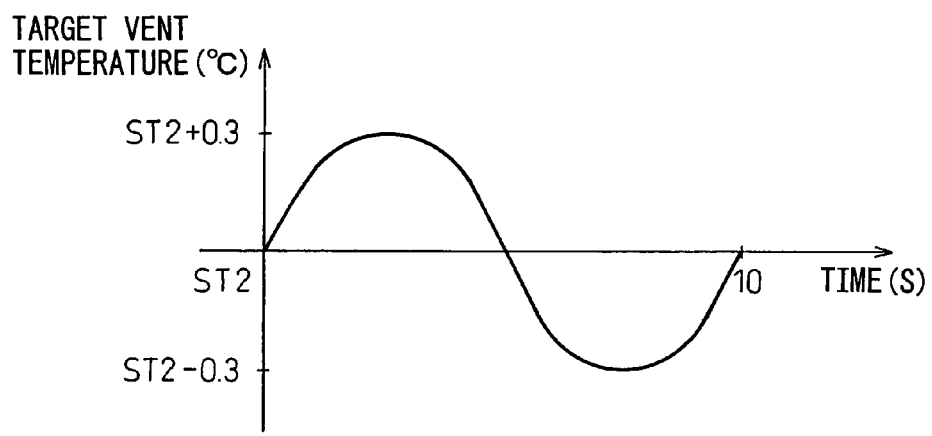
FIG. 11 is a view of changes in the target vent temperature when giving fluctuation to the vent temperature of the air vented from the seat heating and cooling system.

In the first embodiment and second embodiment, when tiredness of the driver was detected, the heating was performed for a predetermined time at a certain target temperature (or target vent temperature) calculated based on the temperature setting corresponding to the tiredness degree, but the target temperature may also be made to fluctuate. For example, in the second embodiment, when the tiredness degree TD is from 2% to less than 5%, as shown in FIG. 11, it is possible to make the vent temperature fluctuate in the range of ST2±0.3° C. for a heating time of 10 seconds. Further, in this embodiment, in the interval from when the tiredness is detected to when the tiredness is reduced to less than 2%, the heating is intermittently repeated by cycles of about 2 minutes, but it is also possible to make the heating time and heating suspension time fluctuate in this case within a predetermined range. If making the temperature of heating or the heating time fluctuate in this way, the driver will not easily feel uncomfortable.

In the first embodiment and second embodiment, when tiredness of the driver is detected, the heating by the electric heater 3 or the venting of air by the seat heating and cooling system 37 was intermittently performed until the tiredness degree TD was reduced to less than 2%, but it is also possible to perform this continuously.

In the first embodiment and second embodiment, the system was controlled based on the tiredness degree TD while dividing the tiredness degree TD into three ranges of "2% to less than 5%", "5% to less than 10%", and "10% or more", but this may be divided into different ranges. Further, the invention is not limited to three ranges. It is also possible to divide the tiredness degree TD to two ranges or four or more ranges. Further, it is also possible to make the range of tiredness degree TD where tiredness is detected one stage, that is, divide the tiredness degree TD into just a case where tiredness is detected (for example, a tiredness degree TD of 2% or more) and a case where tiredness is not detected (tiredness degree TD is less than 2%) and control the system in the same way without regard as to the value of the tiredness degree TD when tiredness is detected.

Further, in the first embodiment and second embodiment, the target temperature (or target vent temperature) and heating time when detecting the tiredness of the driver 7 were set corresponding to the same three ranges of tiredness, but for example both when the tiredness degree TD is 2% to less than 5% and when it is 5% to less than 10%, it is possible to set the heating time to 15 seconds and set the target temperature and heating time for tiredness degree ranges divided differently.

In the second embodiment, the air vented when the temperature setting was lower than the seat temperature was made cool air and this was stopped when tiredness of the driver 7 was detected, but it is also possible to make the air vented when the target vent temperature ST2 is less than 25° C. cool air and set the flow rate SB at LEVEL 0 in this case so as to stop venting of the air.

In the second embodiment, at step 135 and step 185, the target vent temperature ST2 from the heating and cooling system 37 was determined based on the seat temperature AST and temperature setting, but it is also possible to determine this considering the air temperature etc. around the seat.

In the second embodiment, the heater/cooler 39 of the heating and cooling system 37 was configured using a device utilizing the generation and absorption of heat by the Peltier effect, but it is also possible to configure it by a thermoelectric device having a thermo-electric conversion ability or to configure it by an electronic cooling device.

In the first embodiment and second embodiment, control for adjustment of the seat temperature was performed by a dedicated seat temperature adjustment ECU, but it is also possible to execute it by an air-conditioner ECU etc.

In the first embodiment and second embodiment, the temperature of the driver's seat of the vehicle was adjusted in accordance with the tiredness degree, but it is also possible to adjust the temperature of the adjoining seat in accordance with the tiredness degree. Alternatively, it is also possible to adjust the seat temperature for only the adjoining seat in accordance with the tiredness degree, and control the driver's seat so as to wake up a drowsy seated person. Further, it is also possible to adjust the temperature of the rear seats in accordance with the tiredness degree. Further, in a vehicle in which people mainly sit in the rear seats, it is also possible to adjust the temperature in accordance with the tiredness degree for only the rear seats.

In the first embodiment and second embodiment, the present invention was applied to a temperature control system for seats of a vehicle, but the invention is not limited to this. The present invention may also be applied to seats of an aircraft, dentist chairs, barbershop chairs, and other seats where persons sit in a state where they cannot freely get up or office chairs for the workplace or home, reclining chairs for the home, and various other seats.

Third Embodiment

Figure 12:
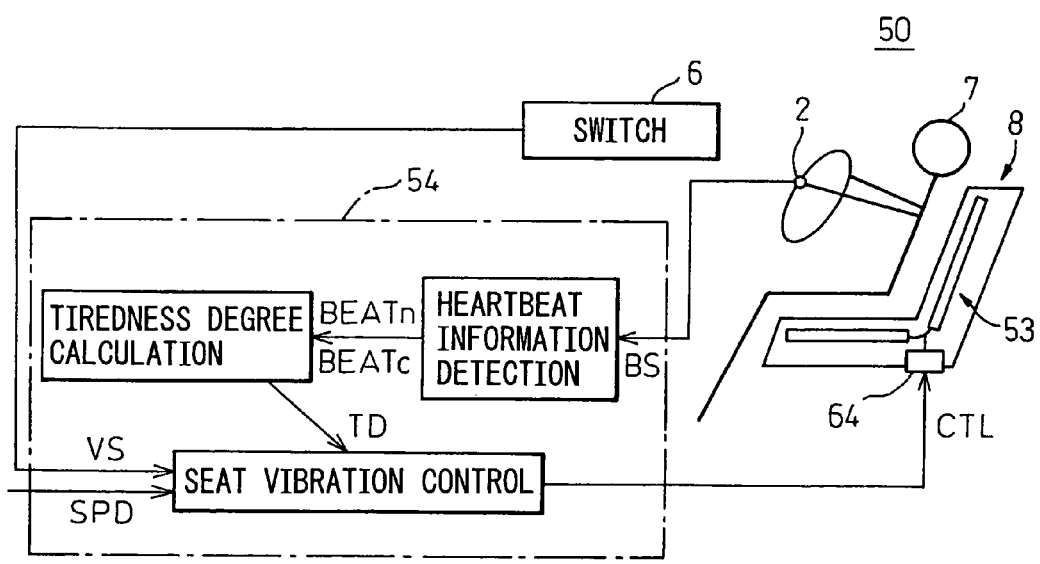
FIG. 12 is a view of the overall configuration of a vehicle tiredness alleviating system according to a third embodiment of the present invention.

The vehicle tiredness alleviating system according to a third embodiment of the present invention is mounted in a vehicle and generates vibration at the driver's seat. FIG. 12 shows the overall configuration of the vehicle tiredness alleviating system 50. The steering wheel of the vehicle has a metal electrode 2 for detecting heartbeat information BS from the driver (seated person) 7 sitting in the driver's seat 8 built into it. The driver's seat 8 has a vibration unit 53 for vibrating the seat built into it.

Figure 13:
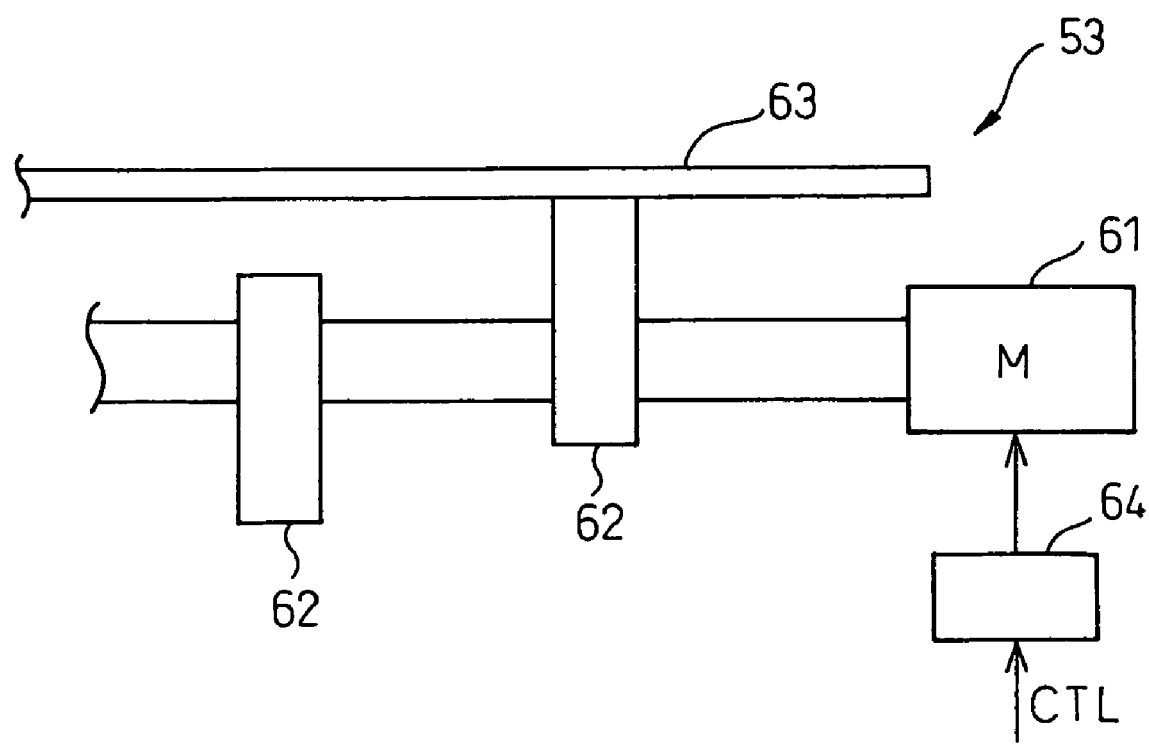
FIG. 13 is a schematic view of the configuration of a vibration unit shown in FIG. 12.

The vibration unit 53, as shown in FIG. 13, comprised of a motor 61, an eccentric disk 62 attached to a shaft connected to a shaft of the motor 61, a vibration plate 63, and a drive circuit 64 for driving the motor 61. The eccentric disk 62 rotates along with operation of the motor 61. The eccentric disk 62 strikes the vibration plate 63 to thereby cause the seat 8 to vibrate. The driver 7 can switch vibration of the seat 8 by the vibration unit 53 to "ON" and "OFF" by a switch 6 provided in the passenger compartment.

The seat vibration ECU 54 receives a switch signal VS indicating the ON/OFF operation of the driver from the switch 6, controls the system so that the seat 8 is made to vibrate when the switch 6 is turned ON by the driver based on the switch signal VS, and controls the system so that the vibration is stopped when the switch 6 is turned OFF.

The seat vibration ECU 54 further detects the tiredness of the driver based on the heartbeat information BS of the driver detected by the metal electrode 2 and, when judging that the driver is tired, performs control based on the tiredness degree with priority over the above normal control.

The seat vibration ECU 54 is provided inside it with a microcomputer comprised of a not shown CPU, ROM, RAM, etc. and is configured to operate by the supply of power from a car battery (not shown) when the ignition switch (not shown) of the vehicle is ON. The seat vibration ECU 54 operates as follows by execution of a program stored in the ROM.

When a predetermined time (for example 5 minutes) elapses from when the driver 7 turns the ignition switch of the vehicle ON and initially starts driving, the heartbeat signal BS of the driver 7 is detected by the metal electrode 2 for a predetermined time from that time (for example, 10 minutes) and the normal number of heartbeats of the driver 7 BEATn at the time of driving is calculated from heatbeat information obtained for a predetermined time. After this, the heartbeat signal BS of the driver 7 continues to be detected and is stored. Every two minutes, the current number of heartbeats BEATc is calculated from the stored heartbeat information. The ratio by which the current number of heartbeats BEATc falls from the normal number of heartbeats BEATn is calculated as the tiredness degree TD of the driver 7.

When the tiredness degree TD exceeds a predetermined value, it is judged that the driver 7 is tired, the strength of vibration (vibration strength) and duration of vibration (vibration time) of the seat 8 by the vibration unit 53 are determined based on the value of the tiredness degree TD, and a control signal CTL is output to the drive circuit 64 of the vibration unit 53 so that the vibration of that strength is executed temporarily for the determined duration.

On the other hand, when the tiredness degree TD is less than a predetermined value, when the switch signal VS indicates ON based on the switch signal VS from the switch 6, a control signal CTL is output to the drive circuit 64 of the vibration unit 53 so that vibration at a predetermined strength and suspension of vibration are repeated at predetermined intervals. When the switch signal VS indicates OFF, the control signal CTL is output so that the vibration is stopped.

Figure 14:
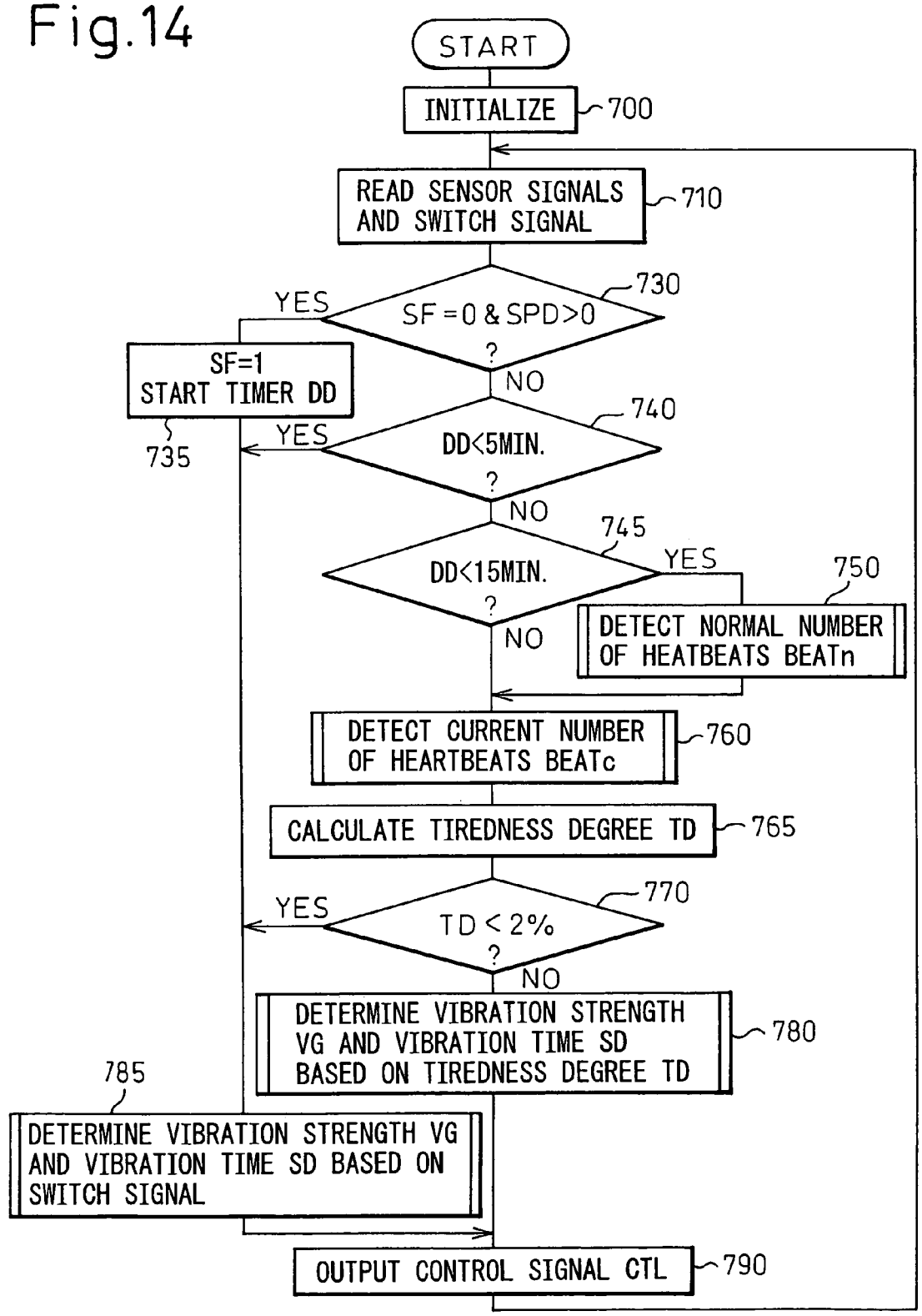
FIG. 14 is a flow chart of the main routine of processing for control executed by the seat vibration ECU shown in FIG. 12.

FIG. 14 shows the routine of processing to be executed by the seat vibration ECU 54. The seat vibration ECU 54 starts operation when the ignition switch of the vehicle is turned ON and, at step 700, initializes the stored content of a data processing memory (RAM) etc. At this time, the operation start flag SF and vibration time SD used at the later steps are initialized to "0".

The operation start flag SF is set to "1" when the driver turns the ignition switch of the vehicle ON and initially starts driving and continues to be set to "1" after that until the ignition switch is turned OFF and the seat vibration ECU 54 ends its operation. Further, the vibration time SD expresses the vibration duration when temporarily vibrating the seat based on the tiredness degree and is set at the later step 780 or 785.

Next, at step 710, the various sensor signals and switch signal are read. At this time, the vehicle speed signal SPD from the speed sensor (not shown), the switch signal VS from the switch 6, etc. are read.

At step 730, it is judged if the condition "SF=0 & SPD>0" is satisfied. When it is judged "YES", it is judged that the driver 7 has started driving. At step 735, the operation start flag SF is set to "1" and the timer DD is started. The timer DD is used to measure the time elapsed from when the driver turns the ignition switch ON and initially starts driving. Further, at step 785, the vibration strength VG and the vibration time SD are determined based on the switch signal VS.

When the switch signal VS indicates ON, at step 785, the vibration strength VG is set to for example 0.1 G and the vibration time SD is set to for example 20 seconds. Further, when the switch signal indicates OFF, the vibration time SD is set to 0 second. When step 785 finishes being executed, the routine proceeds to step 790.

On the other hand, when it is judged "NO" at step 730, the routine proceeds to step 740, where it is judged if the timer DD shows less than 5 minutes. When it is judged "YES", the routine proceeds to step 785, where the vibration strength VG and the vibration time SD are determined based on the switch signal VS, then the routine proceeds to step 790.

When it is judged "NO" at step 740, the routine proceeds to step 745, where it is judged if the timer DD shows less than 15 minutes. When it is judged "YES", the routine proceeds to step 750, where the normal number of heartbeats BEATn is detected, then the routine proceeds to step 760. Details of the processing for detection of the normal number of heartbeats BEATn at step 750 will be described later. When it is judged "NO" at step 745, the routine bypasses step 750 and proceeds to step 760.

At step 760, the current number of heartbeats BEATc is detected. Details of the processing will be explained later. At step 765, the tiredness degree TD of the driver is calculated based on the normal number of heartbeats BEATn and the current number of heartbeats BEATc. Specifically, when the driver becomes tired, the number of heartbeats tends to fall, so the following equation is used to calculate the ratio by which the current number of heartbeats BEATc falls from the normal number of heartbeats BEATn as the tiredness degree:

$$TD=(BEATn-BEATc)/BEATn$$

Next, at step 770, it is judged if the tiredness degree TD is less than a first predetermined value (for example, 2%). When it is judged "YES", it is judged that the driver is not tired and the routine proceeds to step 785, where the vibration strength VG and the vibration time SD are determined based on the switch signal VS, then the routine proceeds to step 790.

When it is judged "NO" at step 770, the routine proceeds to step 780, where the vibration strength VG and the vibration time SD for vibration of the seat 8 are determined based on the value of the tiredness degree TD and the routine proceeds to step 790. Details of the processing at step 780 will be explained below.

At step 790, a control signal CTL is output to the drive circuit 64 of the vibration unit 53 based on the vibration strength VG and the vibration time SD determined at step 780 or step 785. Specifically, when the vibration time SD is larger than 0, the seat 8 is vibrated by the strength VG for the vibration time SD. When the vibration time SD ends, the vibration is stopped. When the vibration time SD is 0, the vibration by the vibration unit 53 is continuously stopped.

After execution of step 790, the routine returns to step 710, where the following steps are repeatedly executed. Since a time of about 2 minutes is required for the processing for detecting the current number of heartbeats BEATc at step 760, after the execution of the detection of the normal number of heartbeats at step 750, that is, after about 15 minutes have elapsed from the start of driving by the driver, steps 710 to 790 are executed at a cycle of about 2 minutes.

Therefore, when tiredness of the driver 7 is detected (when the tiredness degree TD is more than 2%), the vibration at a strength corresponding to the tiredness degree TD is repeated intermittently in cycles of about 2 minute until the tiredness degree TD is reduced to less than 2%. When tiredness of the driver 7 is not detected, only when the switch 6 is ON, vibration at a constant strength is repeated intermittently in cycles of about 2 minutes.

The routine of the processing for detecting the normal number of heartbeats executed at step 750 is similar to the routine shown in FIG. 3 relating to the vehicle tiredness alleviating system according to the first embodiment. That is, at step 200, the timer BD is started. At step 205, the heartbeat signal BS of the driver is read from the metal electrode 2 and stored. At this time, the heartbeat signal BS is sampled at a predetermined frequency (for example, at least 100 Hz), filtered by a for example 6 to 30 Hz bandpass filter, then stored. At step 210, it is judged if the timer BD shows more than 10 minutes. When it is judged "NO", the routine returns to step 205, where the heartbeat signal is read and stored again. By this, the heartbeat signal for 10 minutes is stored. In this case, however, the time for storing the heartbeat signal is not limited to 10 minutes. It is possible to set the time so that the data necessary for accurately calculating the normal number of heartbeats BEATn of the driver at the time of driving can be obtained.

When it is judged "YES" at step 210, the routine proceeds to step 220, where the normal number of heartbeats BEATn is calculated from the heartbeat data for 10 minutes. Specifically, as shown in FIG. 4, the RRI data is calculated using the wave exceeding a predetermined threshold as the R wave and the time interval (heartbeat interval) as RRI. The average value RRIavg of the heartbeat interval RRI is calculated from the calculated RRI data and this is used to find the average normal number of heartbeats BEATn at the time of driving by the following equation:

$$BEATn=60/RRIavg$$

After step 220 finishes being executed, the main routine is returned to.

The routine of the processing for detecting the current number of heartbeats executed at step 760 shown in FIG. 14 is similar to the routine shown in FIG. 5 relating to the vehicle tiredness alleviating system according to the first embodiment. That is, first, at step 300, the time BD is started. At step 305, in the same way as step 205, the heartbeat signal BS of the driver is read from the metal electrode 2 and stored. At step 310, it is judged if the timer BD shows more than 2 minutes. When it is judged "NO", the routine returns to step 305, where the heartbeat signal BS is read and stored again. In this way, the heartbeat signal BS of 2 minutes is stored. In this case, however, the time for storing the heartbeat signal BS is not limited to 2 minutes. The time can be set to a time where the data necessary for accurately calculating the current number of heartbeats BEATc of the driver can be obtained.

When it is judged "YES" at step 310, the routine proceeds to step 320, where the current number of heartbeats BEATc is calculated from the heartbeat data of 2 minutes in the same way as step 220. After step 320 finishes being executed, the main routine is returned to.

Figure 15:
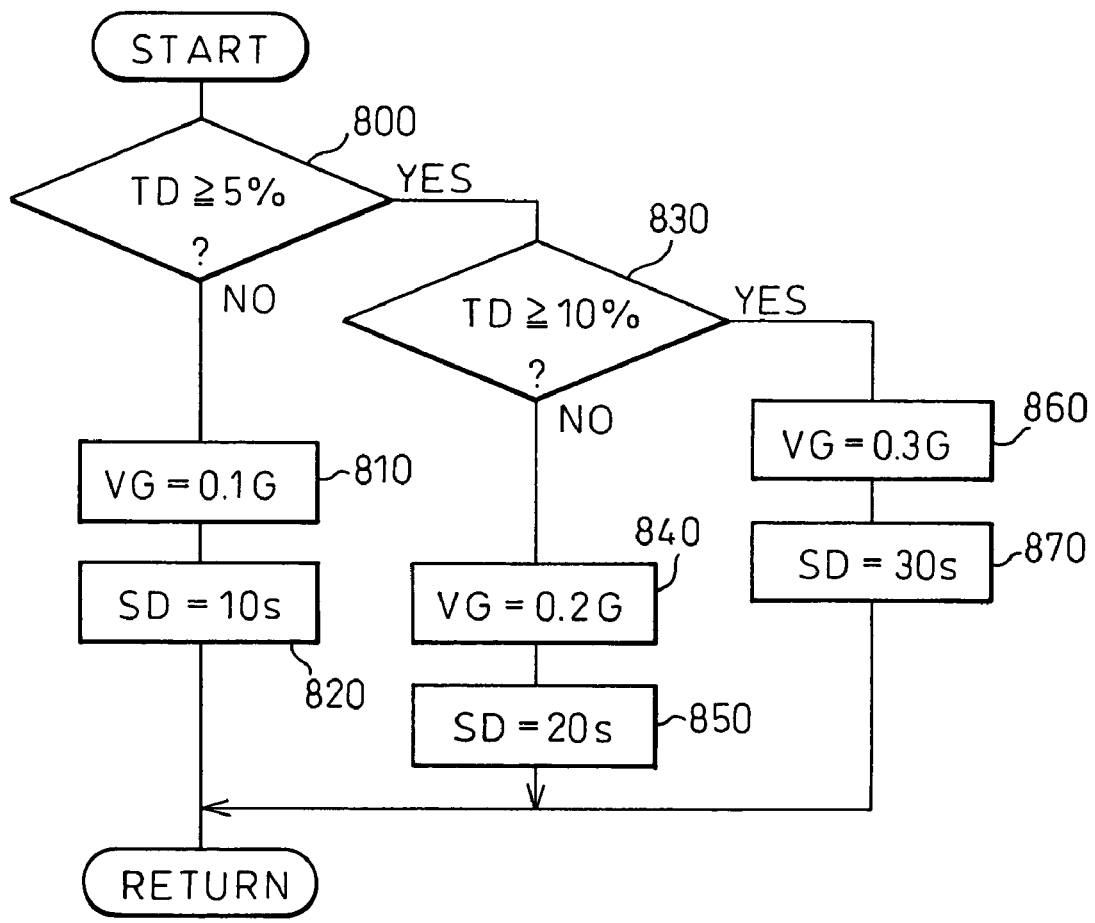
FIG. 15 is a flow chart of processing for determining a vibration strength and vibration time based on the tiredness degree executed at step 180 of FIG. 14.

FIG. 15 shows the routine of the processing for determining the vibration strength VG and vibration time SD based on the tiredness degree TD executed at step 780 shown in FIG. 14. First, at step 800, it is judged if the tiredness degree TD is a second predetermined value (for example, 5%) or more. If it is judged "NO", that is, if the tiredness degree TD is 2% to less than 5%, it is judged that the tiredness is small and the routine proceeds to step 810, where the vibration strength VG is set relatively low, for example, 0.1 G. Further, at step 820, the vibration time SD is set relatively short, for example, 10 seconds. After this, the main routine is returned to.

On the other hand, when it is judged "YES" at step 800, the routine proceeds to step 830, where it is judged if the tiredness degree TD is more than a predetermined value (for example, 10%) larger than the second predetermined value (5%). When it is judged "NO", that is, when the tiredness degree TD is 5% to less than 10%, it is judged that the tiredness is a medium extent and the routine proceeds to step 840, where the vibration strength VG is set slightly high, for example, 0.2 G. Further, at step 850, the vibration time SD is set slightly long, for example, to 20 seconds. After this, the main routine is returned to.

When it is judged "YES" at step 830, that is, when the tiredness degree TD is more than 10%, it is judged that the tiredness is large and the routine proceeds to step 860, where the vibration strength VG is set higher, for example, to 0.3 G. Further, at step 870, the vibration time SD is set further longer, for example, to 30 seconds. After this, the main routine is returned to.

In this way, when the tiredness degree TD is less than 2%, the vibration unit 53 is controlled based on the ON/OFF state of the switch 6 by the driver 7. While the tiredness degree TD is 2% to less than 5%, vibration at a strength of 0.1 G for 10 seconds is intermittently repeated at cycles of about 2 minutes. While the tiredness degree TD is 5% to less than 10%, vibration at 0.2 G for 20 seconds is intermittently repeated at cycles of about 2 minutes. While the tiredness degree TD is more than 10%, vibration at a strength of 0.3 G for 30 seconds is intermittently repeated at cycles of about 2 minutes.

In this way, in the vehicle tiredness alleviating system of the present embodiment, when tiredness of the driver 7 is detected, the vibration unit 53 is used to vibrate the seat 8 regardless of whether the driver turns the switch 6 ON or not, so it is possible to relax the muscles and veins of the driver 7 to promote the flow of blood. Due to this, the tiredness of the driver 7 is reduced or the increase of tiredness is suppressed. Further, the vibration of the seat 8 in the case of detection of tiredness is performed at a suitable strength and vibration time corresponding to the tiredness degree, so vibration of the seat 8 at a strength more than necessary and a time more than necessary and thereby the driver feeling uncomfortable can be avoided.

Further, the heartbeat signal can be detected simply compared with other bio information such as brain waves, so if using the ratio of the current number of heartbeats BEATc falling from the normal number of heartbeats BEATn as the tiredness degree TD of the driver, it is possible to calculate the tiredness degree relatively simply and accurately.

The metal electrode 2 in the present embodiment corresponds to the seated person information detecting means of the present invention, while the vibration unit 53 corresponds to the vibration generating means of the present invention. Further, steps 750 and 760 correspond to the seat person information detecting means of the present invention, steps 765 and 770 correspond to the tiredness judging means of the present invention, and steps 780 and 790 correspond to the vibration control means of the present invention. The vibration time SD in the present embodiment corresponds to the predetermined duration of the present invention. The first predetermined value used at step 770 corresponds to the first predetermined value and third predetermined value of the present invention, while the second predetermined value used at step 800 corresponds to the second predetermined value and fourth predetermined value of the present invention.

Other Embodiments

The present invention is not limited to the third embodiment explained above and can be modified in various way as follows.

In the third embodiment, the heartbeat signal from the driver was detected by a metal electrode built into the steering wheel, but it is also possible to directly attach the metal electrode to the driver and detect the heartbeat signal by this electrode. Further, the electrode is not limited to a metal electrode. It need only be a conductive one, for example, a gel-like conductive substrate electrode. Further, the heartbeat signal of the driver may also be detected by an ultrasonic sensor, acceleration sensor, etc. built into the seat.

In the third embodiment, tiredness was detected based on the drop in the number of heartbeats of the driver, but it is also possible to detect the tiredness based on the decline in the heartbeat interval or amplitude of the heartbeat waveform. Further, it is also possible to detect tiredness based on other bio information in addition to heartbeat information. For example, it is possible to detect tiredness based on brain wave information, blood pressure information, skin electrical activity information, eyeball information (blinking, line of sight, etc.), or other bio signal or information relating to secretions (sweat, saliva, or other bio substances). When the driver is tired, an increase in alpha waves in the brain waves, a rise in blood pressure, etc. is seen. Further, the potential difference of the skin approaches 0, the opening or blinking of the eye becomes less frequent, and movement of the line of sight becomes slower. Further, secretion of sweat is reduced and the cortisole in the saliva is reduced.

Further, it is possible to detect tiredness based on the motion information of the driver, seated time information (seated duration), etc. rather than the bio information. When the driver is tired, he may be observed to exhibit motion such as movement of the upper torso front and back and laterally or lifting of the waist, so when such movement is detected, it is possible to judge that the driver is tired. When detecting tiredness based on the seated time information, for example, when the seated duration exceeds one hour, the driver can be judged to be tired. After this, when the seated duration exceeds a predetermined value (for example, two hours), it is possible to judge that the tiredness has increased.

Further, to more accurately calculate the tiredness of the driver, it is also possible to use the bio information, motion information, and seated time information combined.

In the third embodiment, a vibration unit 53 for making a vibration plate 63 vibrate by an eccentric plate 32 driven by the motor 61 was used as the vibration generating means for making the driver's seat vibrate, but the invention is not limited to this. It is also possible to use an electromagnetically driven piston etc. to make the vibration plate 63 vibrate.

In the third embodiment, when tiredness of the driver was detected, vibration was performed at a certain vibration strength and vibration time determined in accordance with the tiredness degree, but it is also possible to give fluctuation to the vibration strength. In this case, for example as the vibration generating means, it is possible to build a bodily sensation speaker for reproducing an audio signal and simultaneously generating low frequency vibration and use that speaker to generate vibration of the seat 8 linked with the sound.

Further, in the third embodiment, the vibration was intermittently repeated by a cycle of about 2 minutes in the interval from when tiredness was detected to when the tiredness is reduced to less than 2%, but it is also possible to make the vibration time and vibration suspension time in this case fluctuate within predetermined ranges. By making the vibration strength and vibration time fluctuate in this way or linking vibration with sound, the driver can be kept from feeling the vibration of the seat is uncomfortable.

In the third embodiment, the system was controlled based on the tiredness degree TD while dividing the tiredness degree TD into three ranges of "2% to less than 5%", "5% to less than 10%", and "10% or more", but this may be divided into different ranges. Further, the invention is not limited to three ranges. It is also possible to divide the tiredness degree TD to two ranges or four or more ranges. Further, it is also possible to make the range of tiredness degree TD where tiredness is detected one stage, that is, divide the tiredness degree TD into just a case where tiredness is detected (for example, a tiredness degree TD of 2% or more) and a case where tiredness is not detected (tiredness degree TD is less than 2%) and control the system in the same way without regard as to the value of the tiredness degree TD when tiredness is detected.

Further, in the third embodiment, the vibration strength and vibration time when detecting the tiredness of the driver 7 were set corresponding to the same three ranges of tiredness, but for example both when the tiredness degree TD is 2% to less than 5% and when it is 5% to less than 10%, it is possible to set the vibration time to 15 seconds or otherwise set the vibration strength and vibration time for tiredness degree ranges divided differently.

In the third embodiment, the cycle of execution of steps 710 to 790 shown in FIG. 14 was about 2 minutes, so both when vibrating the seat by normal control and when vibrating the seat based on the tiredness degree TD, the cycle at which vibration is intermittently given becomes about 2 minutes. At step 780 or step 785, by setting the cycle of vibration and the number of repetitions during these two minutes, it is also possible to vibrate the seat at a shorter cycle than 2 minutes.

In the third embodiment, the driver's seat of the vehicle was made to vibrate in accordance with the tiredness degree, but it is also possible to make the adjoining seat vibrate in accordance with the tiredness degree. Alternatively, it is also possible to limit vibration of the seat in accordance with the tiredness degree to only the adjoining seat and control the driver's seat to wake up a drowsy seated person. Further, it is also possible to make the rear seats vibrate in accordance with the tiredness degree. Further, in a vehicle in which people mainly sit in the rear seats, it is also possible to make only the rear seats vibrate in accordance with the tiredness degree.

In the third embodiment, the present invention was applied to a seat of a vehicle, but the invention is not limited to this. The present invention may also be applied to seats of an aircraft, dentist chairs, barbershop chairs, and other seats where persons sit in a state where they cannot freely get up or office chairs for the workplace or home, reclining chairs for the home, and various other seats.

Fourth Embodiment

Figure 16:
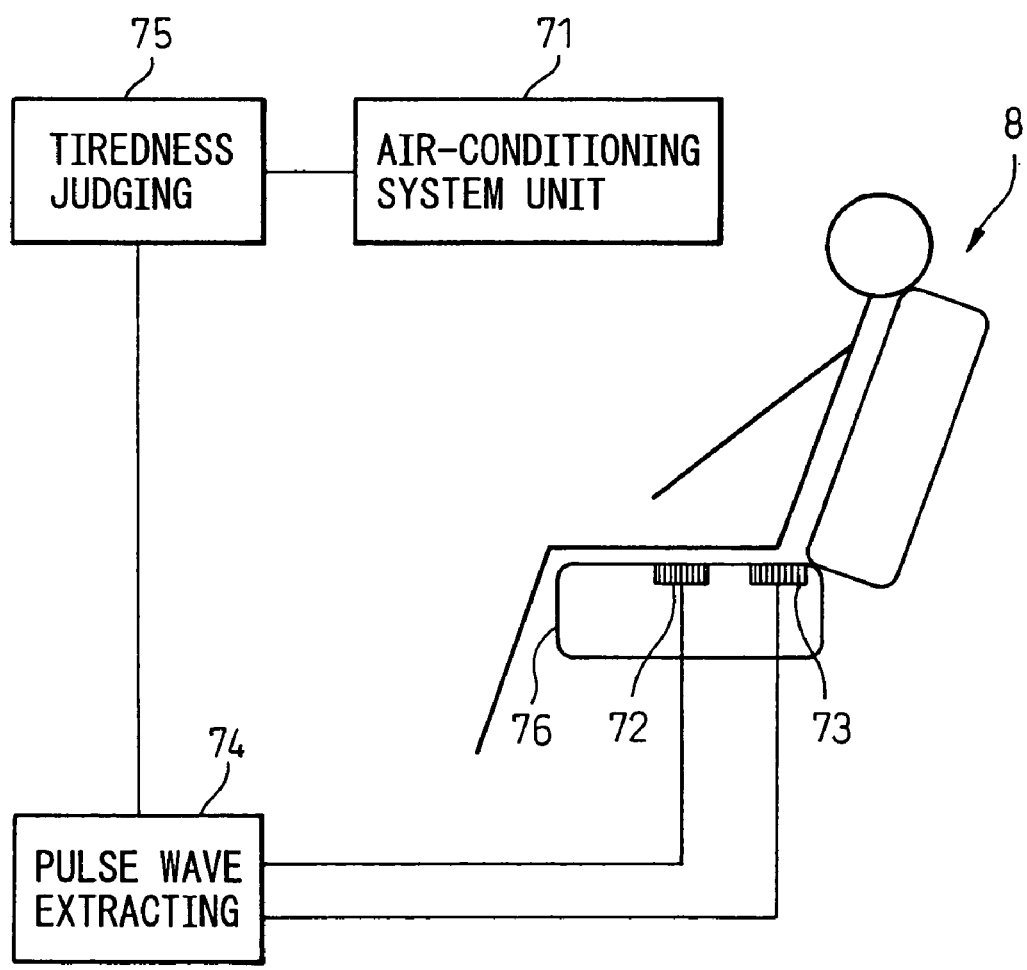
FIG. 16 is a view of the overall configuration of a vehicle tiredness alleviating system according to a fourth embodiment of the present invention.
Figure 17:
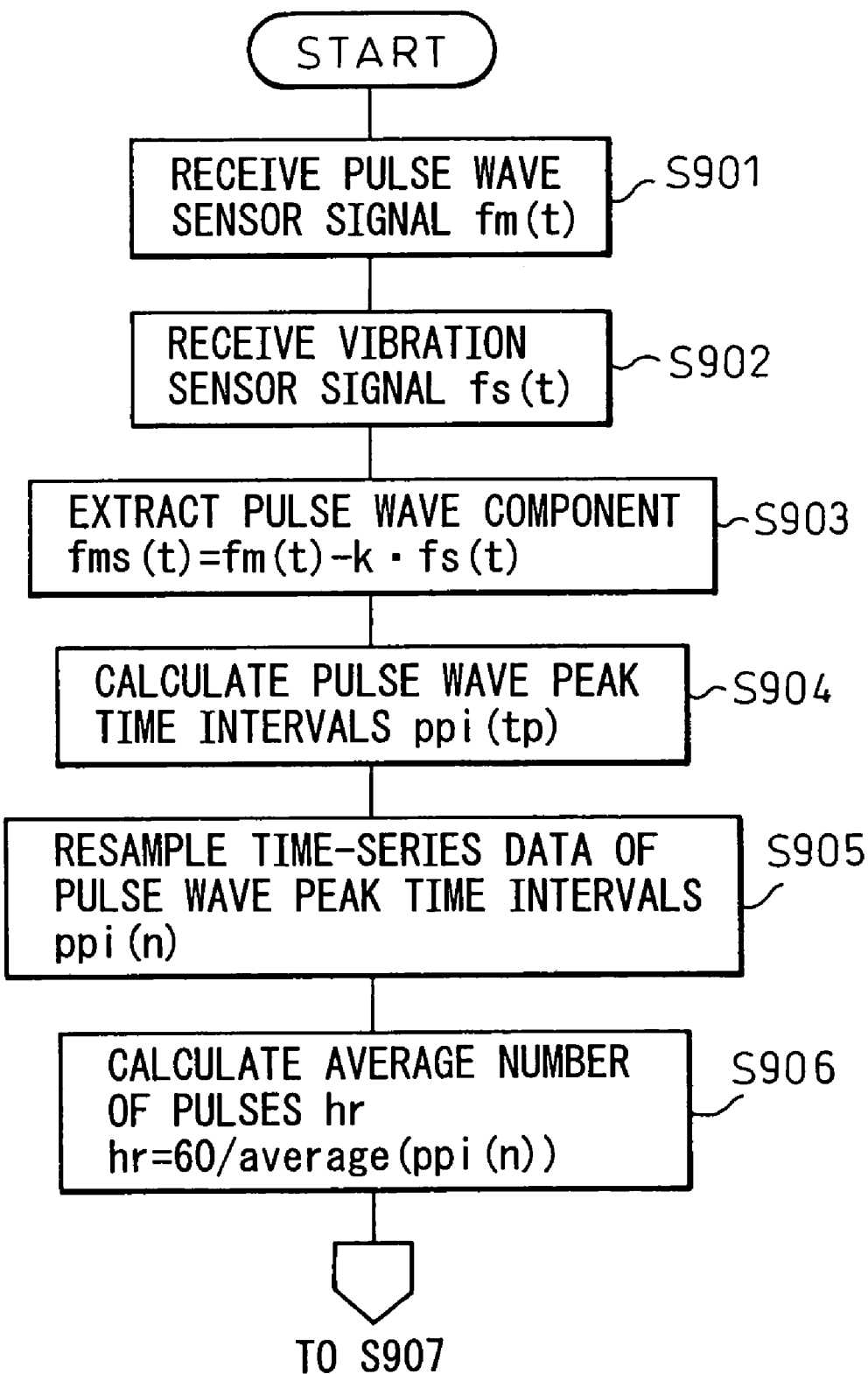
FIG. 17 is a first part of a series of flow charts expressing processing executed by a pulse wave extracting means and tiredness judging means shown in FIG. 16.
Figure 18:
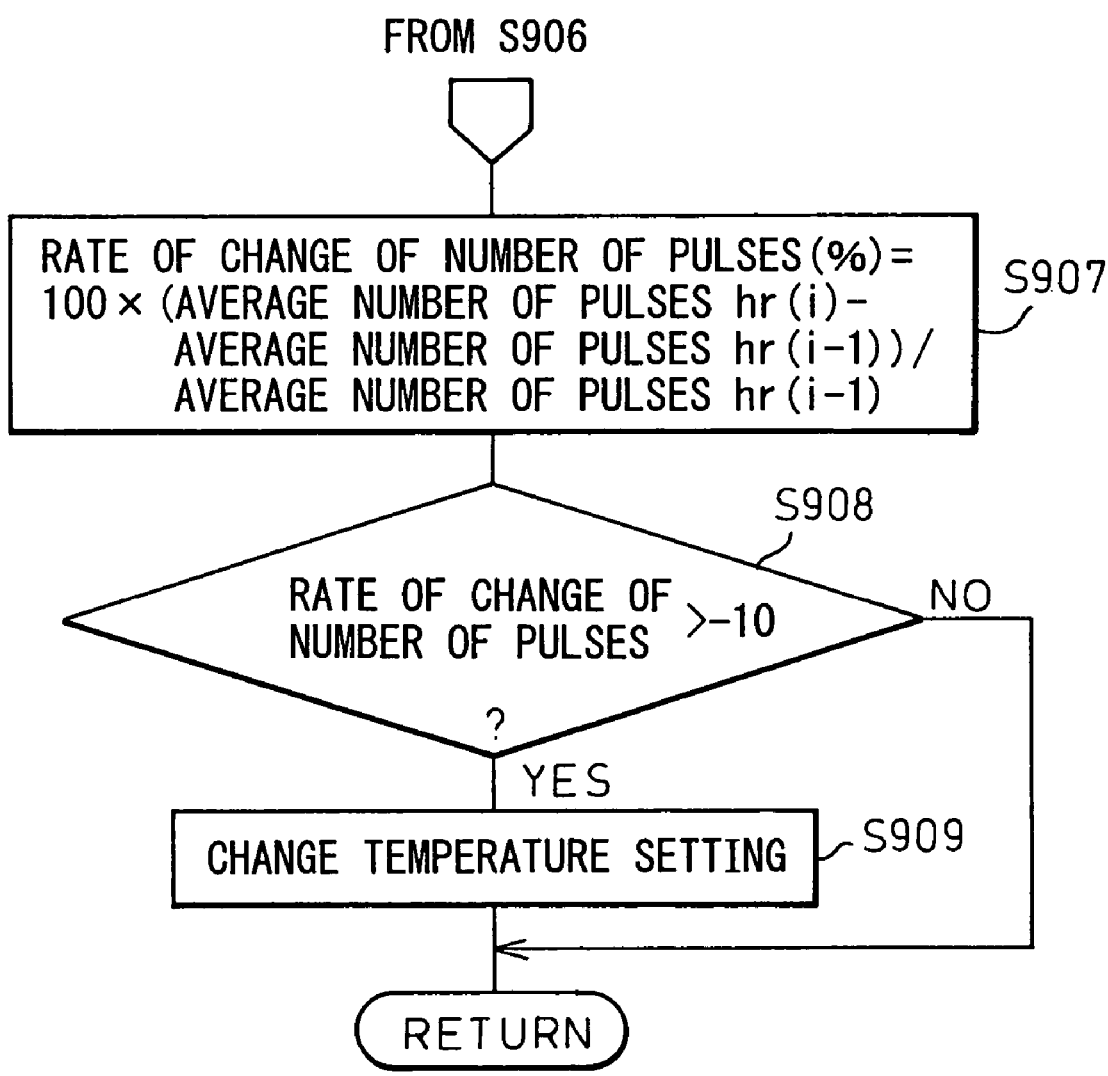
FIG. 18 is a second part of a series of flow charts expressing processing executed by a pulse wave extracting means and tiredness judging means shown in FIG. 16.

FIG. 16 is a block diagram of the configuration of a vehicle tiredness alleviating system according to a fourth embodiment of the present invention, while FIG. 17 and FIG. 18 are a series of flow charts expressing processing executed by the pulse wave extracting means and tiredness judging means shown in FIG. 16.

In FIG. 16, the vehicle tiredness alleviating system is provided with an ordinary air-conditioning system unit 71, for example, an air-conditioning system unit 71 provided with an evaporator, heater core, blower motor, etc., taking in air from inside or outside the vehicle, exchanging heat with the intaken air, and venting the heat exchanged air to the inside of the vehicle, and a pulse wave sensor 72, vibration sensor 73, pulse wave extracting means 74, and tiredness judging means 75.

The pulse wave sensor 72 is a pressure sensor provided at the driver's seat 76 for detecting the pulse wave of the driver. The detection signal of the pulse wave sensor 72 also includes a noise component (vibration component) due to bodily movement by the driver itself and bodily movement of the driver occurring along with driving of the vehicle in addition to the pulse wave component of the driver. The pulse wave sensor 72 is preferably provided at a portion of a high seating pressure at the driver's seat 76. If set in this way, the level of the pulse wave component in the detection signal of the pulse wave sensor 72 becomes large. This is because at a portion of a high seating pressure, the veins are constricted at the same time as the measurement of the blood pressure and the blood flow hits the constricted veins so the vibration and noise occurring at that time become large. Therefore, the noise component in the detection signal of the pulse wave sensor becomes smaller than the pulse wave component of the signal component.

The vibration sensor 73 is a pressure sensor provided at the driver's seat 76 for detecting vibration of the driver's seat 76. The detection signal of the vibration sensor 73 is comprised of only the vibration component due to bodily movement by the driver itself and the bodily movement of the driver occurring along with driving of the vehicle and does not include the pulse wave component of the driver. The vibration sensor 73 is preferably provided at a portion of a low seating pressure at the driver's seat 76. When provided in this way, it is possible to prevent the detection signal of the vibration sensor 73 from including the pulse wave component becoming noise for the detection signal.

The pulse wave extracting means 74 is a processing means for extracting a pulse wave component based on the detection signal of the pulse wave sensor 72, that is, the pulse wave sensor signal, and the detection signal of the vibration sensor 73, that is, the vibration sensor signal. The pulse wave extracting means 74 captures the vibration component included in the detection signal of the vibration sensor 73 as corresponding to the noise component (vibration component) included in the detection signal of the pulse wave sensor 72 and performs processing for extracting only the pulse wave component from the pulse wave component and noise component (vibration component) included in the detection signal of the pulse wave sensor 72.

The tiredness judging means 75 is a processing means for judging the tiredness of the driver based on the pulse wave component extracted by the pulse wave extracting means 74 and outputting a command signal in accordance with the judged tiredness to the air-conditioning system unit 71. The tiredness judging means 75 judges tiredness of the driver based on the pulse wave component extracted by the pulse wave extracting means 74. Further, the tiredness judging means 75 outputs a command signal corresponding to the judged tiredness to the air-conditioning system unit 71.

The air-conditioning system unit 71 controls the air-conditioning in accordance with a command signal. When the command signal indicates "control of air-conditioning at time of tiredness", the air vent temperature is set to a higher temperature than the current temperature to recover from the tiredness in accordance with the tiredness degree, while when the command signal indicates "control of air-conditioning at the time of no tiredness", the normal control of air-conditioning is continued.

Next, the processing executed by the pulse wave extracting means 74 and the tiredness judging means 75 will be explained based on FIG. 17 and FIG. 18.

First, the detection signal of the pulse wave sensor 2, that is, the pulse wave sensor signal fm(t), is received and the detection signal of the vibration sensor 73, that is, the vibration sensor signal fs(t), is received (step S901 and S902).

Next, the pulse wave component fms(t) is extracted based on the pulse wave sensor signal fm(t) and the vibration sensor signal fs(t) (step S903). This pulse wave component fms(t) is found by subtracting from the pulse sensor signal fm(t) the value k·fs(t) of the vibration sensor signal fs(t) multiplied with a constant k, that is, calculates fms(t)=fm(t)−k·fs(t).

Next, the pulse wave peak time interval ppi(tp), that is, the time interval ppi(tp) between adjoining peaks of a pulse wave component for each peak appearance time, is calculated (step S904).

Next, the time-series data of the pulse wave peak time intervals is resampled and the resampled time-series data ppi(n) (n=1 to 10) is found (step S905). Explaining this specifically, the pulse wave peak time intervals for each peak appearance time are plotted with the peak appearance time along the abscissa and the pulse wave peak time intervals for each peak appearance time along the ordinate, the plotted points of the pulse wave peak time intervals are connected by a smooth curve, and the peak time interval for each unit time, for example, every second, is found based on this curve for a predetermined time, for example, 10 seconds.

Next, the average number of pulses hr is calculated (step S906). Specifically, the average value "average" (ppi(n)) for 10 seconds of the resampling time-series data ppi(n) is found and the average number of pulses hr for one minute is found from the equation hr=60/average (ppi(n)).

Next, the rate of change of the number of pulses (%) is found (step S907). The rate of change of the number of pulses (%) is found by calculating 100×(average number of pulses hr(i)−average number of pulses hr(i−1))/average number of pulses hr(i−1).

Next, it is judged if the rate of change of the number of pulses (%) is larger than −10 to judge if the driver is tired (step S908).

If the rate of change of the number of pulses (%) is larger than −10 and the driver is judged to be tired, a command signal for changing the temperature setting is output to the air-conditioning system unit 1 (step S909) and the processing is ended. Here, the change of the temperature setting is for example raising the current temperature setting by a predetermined temperature so as to try to improve the blood flow and thereby recover from the tiredness.

On the other hand, if the rate of change of the number of pulses (%) is less than −10 and the driver is judged not to be tired, the current temperature setting is maintained and the processing is ended.

As explained above, the vehicle tiredness alleviating system according to the present embodiment is provided with an air-conditioning system unit 71, a pulse wave sensor 72 provided at the driver's seat 76 for detecting the pulse wave of the driver, a vibration sensor 73 provided at the driver's seat 76 for detecting vibration of the driver's seat 76, a pulse wave extracting means 74 for extracting the pulse wave component based on the detection signal of the pulse wave sensor 72 and the detection signal of the vibration sensor 73, and a tiredness judging means 75 for judging tiredness of a driver based on the pulse wave component extracted by the pulse wave extracting means 74 and outputting a command signal corresponding to the judged tiredness to the air-conditioning system unit 71.

Therefore, according to the vehicle tiredness alleviating system according to the fourth embodiment, high precision judgment of tiredness becomes possible. Accordingly, the driver does not become numbed and the control of the air-conditioning for reducing tiredness can work more effectively.

Further, by providing the pulse wave sensor 72 at a portion of a high seating pressure at the driver's seat 76 and providing the vibration sensor 73 at a portion of a low seating pressure at the driver's seat 76, the detection signal of the pulse wave sensor 72 becomes mainly the pulse wave component. Further, the detection signal of the vibration sensor 73 is comprised of only the vibration component. Therefore, extraction of a high precision pulse wave component at the pulse wave extracting means 74 becomes possible.

Note that in the present embodiment, one each of the pulse wave sensor 72 and vibration sensor 73 are provided, but it is also possible to provide a plurality of them. In this case, the detection signal of the sensor giving the maximum pressure is used for extraction of the pulse wave component in relation to the pulse wave sensor 72, while the detection signal of the sensor giving the minimum pressure is used for extraction of the pulse wave component in relation to the vibration sensor 73.

According to the vehicle tiredness alleviating system according to the fourth embodiment, high precision judging of tiredness becomes possible. Therefore, therefore the driver does not become numbed and the control of the air-conditioning for reducing tiredness can work more effectively.

In the vehicle tiredness alleviating systems according to the first embodiment, second embodiment, and third embodiment, instead of the metal electrode 2 built into the steering wheel of the vehicle, it is also possible to detect the heartbeat information BS from the driver (seated person) 7 by the pulse wave sensor 72, vibration sensor 73, and pulse wave extracting means 74 provided at the vehicle tiredness alleviating system according to the fourth embodiment.

Fifth Embodiment

Figure 19:
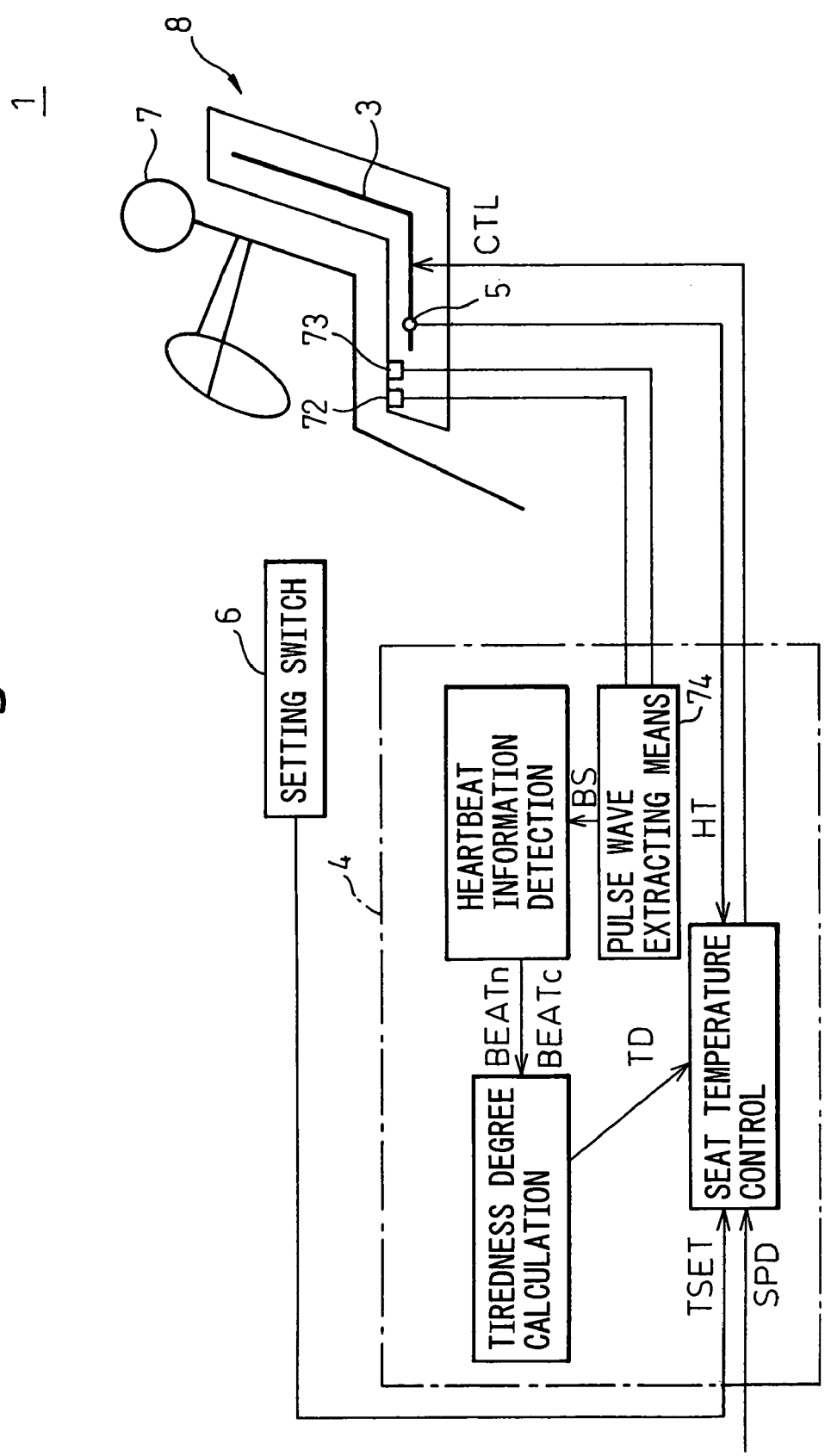
FIG. 19 is a view of the overall configuration of a vehicle tiredness alleviating system according to a fifth embodiment of the present invention.

In the vehicle tiredness alleviating system according to the fifth embodiment of the present invention, instead of the metal electrode 2 built into the steering wheel of the vehicle in the vehicle tiredness alleviating system according to the first embodiment, the heartbeat information BS is detected from the driver (seated person) 7 by the pulse wave sensor 72, the vibration sensor 73, and the pulse wave extracting means 74 provided at the vehicle tiredness alleviating system according to the fourth embodiment. FIG. 19 shows the overall configuration of a vehicle tiredness alleviating system according to the fifth embodiment of the present invention.

That is, the vehicle tiredness alleviating system 1 according to the fifth embodiment of the present invention is mounted in a vehicle and adjusts the temperature of the driver's seat. The driver's seat 8 has a pressure sensor for detecting a pulse wave of the driver for detecting the heartbeat information BS from the seated driver (seated person) 7 constituted by a pulse wave sensor 72 and a pressure sensor for detecting vibration of the seat 8 constituted by the vibration sensor 73 built into it.

The driver's seat 8 has an electric heater 3 for heating the seat buried in it. The driver 7 can switch the electric heater 3 between "strong" and "weak" by the setting switch 6 provided in the passenger compartment.

A seat temperature adjustment ECU 4 receives a signal showing the temperature setting TSET based on a setting by the driver from the setting switch 6, receives a signal HT showing the temperature of the electric heater 3 from the heater temperature sensor 5, and ordinarily outputs a control signal CTL for turning the electric heater 3 ON/OFF so that the heater temperature is adjusted to the temperature setting TSET based on the temperature setting TSET and heater temperature HT. The temperature setting TSET when the driver selects "strong" by the setting switch 6 is for example 50° C., while the temperature setting TSET when selecting "weak" is for example 40° C. Further, the temperature of the seat 8 when the electric heater 3 is 40° C. is about 33° C.

Further, the seat temperature adjustment ECU 4 is provided with a processing means for extracting a pulse wave component constituted by the heartbeat information based on the detection signal of the pulse wave sensor 72, that is, the pulse wave sensor signal, and the detection signal of the vibration sensor 73, that is, the vibration sensor signal, as the pulse wave extracting means 74.

The pulse wave extracting means 74 first subtracts from the pulse wave sensor signal fm(t) the value k·fs(t) of the vibration sensor signal fs(t) multiplied with a constant k based on the detection signal received from the pulse wave sensor 72, that is, the pulse wave sensor signal fm(t), and the detection signal received from the vibration sensor 73, that is, the vibration sensor signal fs(t). That is, fms(t)=fm(t)−k·fs(t) is calculated to extract the heartbeat information BS constituted by the pulse wave component fms(t).

The seat temperature adjustment ECU 4 further detects the tiredness of the driver based on the heartbeat information BS of the driver detected by the pulse wave extracting means 74 and, when judging that the driver is tired, performs control based on the tiredness degree with priority over the above normal control.

The seat temperature adjustment ECU 4 is provided inside it with a microcomputer comprised of a not shown CPU, ROM, RAM, etc. and is configured to operate by the supply of power from a car battery (not shown) when the ignition switch (not shown) of the vehicle is ON. The seat temperature adjustment ECU 4 operates as follows by execution of a program stored in the ROM.

When a predetermined time (for example 5 minutes) elapses from when the driver 7 turns the ignition switch of the vehicle ON and initially starts driving, the heartbeat signal BS of the driver 7 is detected by the pulse wave extracting means 74 for a predetermined time from that time (for example, 10 minutes) and the normal number of heartbeats BEATn at the time of operation by the driver 7 is calculated from heartbeat information obtained for a predetermined time. After this, the heartbeat signal BS of the driver 7 continues to be detected and is stored. Every two minutes, the current number of heartbeats BEATc is calculated from the stored number of heartbeats. The ratio by which the current number of heartbeats BEATc falls from the normal number of heartbeats BEATn is calculated as the tiredness degree TD of the driver 7.

When the tiredness degree TD exceeds a predetermined value, it is judged that the driver 7 is tired, the target temperature and heating time of the electric heater 3 are determined based on the value of the tiredness degree TD, and a control signal CTL is output to the electric heater 3 so that the heating at the target temperature is executed temporarily for the determined heating time.

On the other hand, when the tiredness degree TD is less than a predetermined value, ordinary control is executed and thereby a control signal CTL is output to the electric heater 3 so that the heater temperature is continuously maintained at the temperature setting TSET in accordance with the setting by the driver 7.

Except for the fact that in the vehicle tiredness alleviating system according to the first embodiment of the present invention, the heartbeat information BS is detected from the metal electrode 2 shown in FIG. 1, while in the vehicle tiredness alleviating system according to the fifth embodiment of the present invention, this is changed to the pulse wave sensor 72, the vibration sensor 73, and the pulse wave extracting means 74, the processing routine executed by the vehicle tiredness alleviating system according to the fifth embodiment of the present invention is similar to the processing routine executed by the vehicle tiredness alleviating system according to the first embodiment of the present invention using FIG. 2 and FIG. 6, so the explanation will be omitted.

Sixth Embodiment

Figure 20:
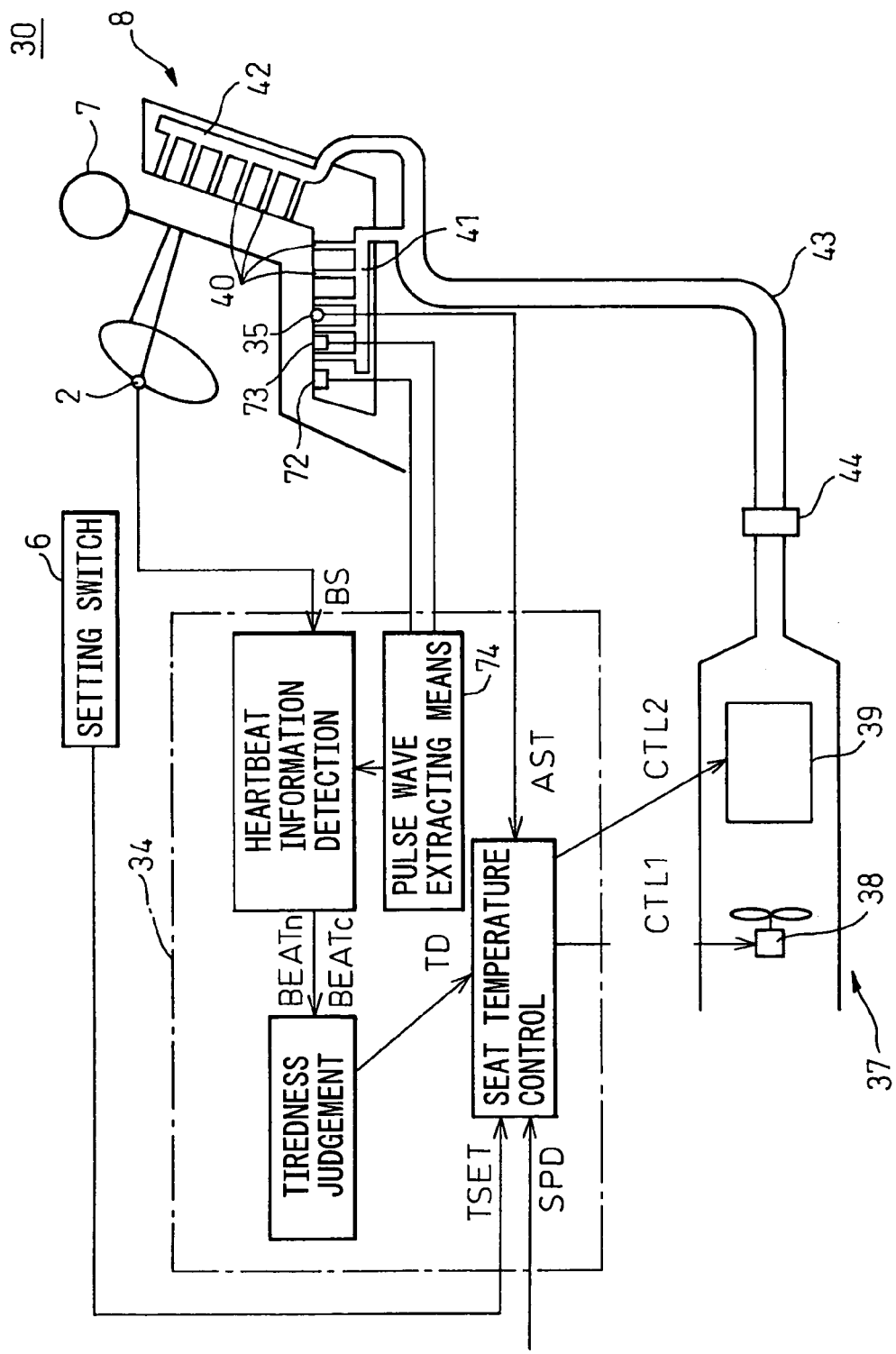
FIG. 20 is a view of the overall configuration of a vehicle tiredness alleviating system according to a sixth embodiment of the present invention.

In the vehicle tiredness alleviating system according to the sixth embodiment of the present invention, instead of the metal electrode 2 built into the steering wheel of the vehicle in the vehicle tiredness alleviating system according to the second embodiment, the heartbeat information BS is detected from the driver (seated person) 7 by the pulse wave sensor 72, the vibration sensor 73, and the pulse wave extracting means 74 provided at the vehicle tiredness alleviating system according to the fourth embodiment. FIG. 20 shows the overall configuration of a vehicle tiredness alleviating system according to the sixth embodiment of the present invention.

That is, the vehicle tiredness alleviating system according to the sixth embodiment of the present invention, in the same way as the fifth embodiment, is mounted in a vehicle and adjusts the temperature of the driver's seat. The driver's seat 8 has a pressure sensor for detecting a pulse wave of the driver for detecting the heartbeat information BS from the seated driver (seated person) 7 constituted by a pulse wave sensor 72 and a pressure sensor for detecting vibration of the seat 8 constituted by the vibration sensor 73 built into it.

The driver's seat 8 is formed with a plurality of air vents 40 at the seat part and the back part.

These air vents 40 are communicated with a passage 41 formed inside the seat part and a passage 42 formed inside the back part. The passages 41 and 42 are connected through an air supply pipe 43 to a vent 44 of the seat heating and cooling system 37.

The seat heating and cooling system 37 air-conditions the seat 8 by supplying warm air or cool air from the vent 44 to the seat 8. The seat heating and cooling system 37 is provided with an electric fan 38 and a heating and cooling system 39. The heating and cooling system 39 is comprised of a device using heat generation and absorption based on the Peltier effect.

The driver 7 can switch the temperature settings of the seat air-conditioning by the seat heating and cooling system 37 among for example three "heating" levels, "neutral", and three "cooling" levels by a setting switch 6 provided inside the passenger compartment.

The seat temperature adjustment ECU 34 receives a signal showing the temperature setting TSET based on a setting by the driver from the setting switch 6, receives the signal showing the seat temperature AST from the seat temperature sensor 35 buried in the seat 8, and normally outputs the control signals CTL1 and CTL2 to the seat heating and cooling system 37 based on the temperature setting TSET and seat temperature AST so that the seat 8 is adjusted to the temperature setting TSET. The temperature setting TSET when the driver 7 selects "neutral" by the setting switch 6 is for example 34° C. When selecting "heating", this is set to a higher temperature, while when selecting "cooling", this is set to a lower temperature.

Further, the seat temperature adjustment ECU 34 is provided with a processing means for extracting a pulse wave component constituted by the heartbeat information based on the detection signal of the pulse wave sensor 72, that is, the pulse wave sensor signal, and the detection signal of the vibration sensor 73, that is, the vibration sensor signal, as the pulse wave extracting means 74.

The pulse wave extracting means 74 first subtracts from the pulse wave sensor signal fm(t) the value k·fs(t) of the vibration sensor signal fs(t) multiplied with a constant k based on the detection signal received from the pulse wave sensor 72, that is, the pulse wave sensor signal fm(t), and the detection signal received from the vibration sensor 73, that is, the vibration sensor signal fs(t). That is, fms(t)=fm(t)−k·fs(t) is calculated to extract the heartbeat information BS constituted by the pulse wave component fms(t).

Further, the seat temperature adjustment ECU 34 detects tiredness of the driver based on the heartbeat information BS of the driver detected by the pulse wave extracting means 74 and, when judging that the driver is tired, controls the system based on the tiredness degree with priority over the above normal control.

The seat temperature adjustment ECU 34 is provided inside it with a microcomputer comprised of a not shown CPU, ROM, RAM, etc. When the ignition switch (not shown) of the vehicle is turned ON, it operates by power supplied from the car battery (not shown). The seat temperature adjustment ECU 34 operates as follows by executing a program stored in the ROM.

First, the tiredness degree TD of the driver is calculated based on the heartbeat information of the driver detected by the pulse wave extracting means 74 by a method similar to the fifth embodiment. When the tiredness degree TD is less than a predetermined value, normal control is executed. Due to this, the target vent temperature (target temperature) and flow rate of the air vented from the vent 44 of the heating and cooling system 37 are determined based on the temperature setting TSET. The control signals CTL1 and CTL2 are output to the electric fan 38 and heater/cooler 39 so that air is continuously vented by the target vent temperature and flow rate.

On the other hand, when the tiredness degree TD exceeds a predetermined value, the driver 7 is judged to be tired, the target vent temperature and flow rate are determined and the heating time is determined based on the temperature setting determined in accordance with the tiredness degree TD. Further, control signals CTL1 and CTL2 are output to the electric fan 38 and the heater/cooler 39 so that the heating at the target vent temperature is executed temporarily for the determined heating time.

In this case, however, when the temperature setting TSET set by the driver 7 is higher than the temperature setting corresponding to the tiredness degree TD, the system is controlled so that air is vented continuously by normal control based on the temperature setting TSET by the driver 7. Further, when the vented air becomes cool air, that is, when the higher (not lower) of the temperature setting corresponding to the tiredness degree TD and the temperature setting TSET by the driver 7 is lower than the seat temperature AST, the venting of air is stopped.

Except for the fact that in the vehicle tiredness alleviating system according to the second embodiment of the present invention, the heartbeat information BS is detected from the metal electrode 2 shown in FIG. 7, while in the vehicle tiredness alleviating system according to the sixth embodiment of the present invention, this is changed to the pulse wave sensor 72, the vibration sensor 73, and the pulse wave extracting means 74, the processing routine executed by the vehicle tiredness alleviating system according to the sixth embodiment of the present invention is similar to the processing routine executed by the vehicle tiredness alleviating system according to the second embodiment of the present invention using FIG. 8 and FIG. 11, so the explanation will be omitted.

Seventh Embodiment

In the vehicle tiredness alleviating system according to the seventh embodiment of the present invention, instead of the metal electrode 2 built into the steering wheel of the vehicle in the vehicle tiredness alleviating system of the third embodiment, the heartbeat information BS is detected from the driver (seated person) 7 by the pulse wave sensor 72, the vibration sensor 73, and the pulse wave extracting means 74 provided at the vehicle tiredness alleviating system according to the fourth embodiment. FIG. 21 shows the overall configuration of a vehicle tiredness alleviating system according to the seventh embodiment of the present invention.

That is, the vehicle tiredness alleviating system according to the seventh embodiment of the present invention is mounted in a vehicle and causes vibration in the driver's seat. The driver's seat 8 has a pressure sensor for detecting a pulse wave of the driver for detecting the heartbeat information BS from the seated driver (seated person) 7 constituted by a pulse wave sensor 72 and a pressure sensor for detecting vibration of the seat 8 constituted by the vibration sensor 73 built into it. The driver's seat 8 has a vibration unit 53 for vibrating the seat built into it.

The vibration unit 53 is similar to the unit shown in FIG. 13 and is comprised of a motor 61, an eccentric disk 62 attached to a shaft connected to a shaft of the motor 61, a vibration plate 63, and a drive circuit 64 for driving the motor 61. The eccentric disk 62 rotates along with operation of the motor 61. The eccentric disk 62 strikes the vibration plate 63 to thereby cause the seat 8 to vibrate. The driver 7 can switch vibration of the seat 8 by the vibration unit 53 to "ON" and "OFF" by a switch 6 provided in the passenger compartment.

The seat vibration ECU 54 receives a switch signal VS indicating the ON/OFF operation of the driver from the switch 6, controls the system so that the seat 8 is made to vibrate when the switch 6 is turned ON by the driver based on the switch signal VS, and controls the system so that the vibration is stopped when the switch 6 is turned OFF.

Further, the seat vibration ECU 54 is provided with a processing means for extracting a pulse wave component constituted by the heartbeat information based on the detection signal of the pulse wave sensor 72, that is, the pulse wave sensor signal, and the detection signal of the vibration sensor 73, that is, the vibration sensor signal, as the pulse wave extracting means 74.

The pulse wave extracting means 74 first subtracts from the pulse wave sensor signal fm(t) the value k·fs(t) of the vibration sensor signal fs(t) multiplied with a constant k. That is, fms(t)=fm(t)−k·fs(t) is calculated to extract the heartbeat information BS constituted by the pulse wave component fms(t).

Further, the seat vibration ECU 54 detects the tiredness of the driver based on the heartbeat information BS of the driver detected by the pulse wave extracting means 74 and, when judging that the driver is tired, controls the system based on the tiredness degree with priority over normal control.

The seat vibration ECU 54 is provided inside it with a microcomputer comprised of a not shown CPU, ROM, RAM, etc. When the ignition switch (not shown) of the vehicle is ON, it operates by the supply of power from the car battery (not shown). The seat vibration ECU 54 operates as follows by execution of a program stored in the ROM.

After a predetermined time (for example, five minutes) elapses after the driver 7 turns the ignition switch of the vehicle ON and initially starts driving, the heartbeat signal BS is detected by the pulse wave detecting means 74 for a predetermined time (for example, 10 minutes) from that point of time and the normal number of heartbeats BEATn at the time of driving by the driver 7 is calculated from the heartbeat information obtained in those 10 minutes (the predetermined time). After this, the heartbeat signal BS of the driver 7 continues to be detected and stored. The current number of heartbeats BEATc of the driver 7 is calculated from the stored heartbeat information every 2 minutes. The ratio by which the current number of heartbeats BEATc falls from the normal number of heartbeats BEATn is calculated as the tiredness degree TD of the driver 7.

When the tiredness degree TD exceeds a predetermined value, the driver 7 is judged to be tired, the strength of vibration (vibration strength) and duration (vibration time) for vibrating the seat 8 by the vibration unit 53 are determined based on the value of the tiredness degree TD, and the control signal CTL is output to the drive circuit 64 of the vibration unit 53 so that vibration at that strength is performed temporarily for the determined duration.

On the other hand, when the tiredness degree TD is less than a predetermined value, when the switch signal VS indicates ON based on the switch signal VS from the switch 6, a control signal CTL is output to the drive circuit 64 of the vibration unit 53 so that vibration at a predetermined strength and suspension of vibration are repeated at predetermined intervals. When the switch signal VS indicates OFF, the control signal CTL is output so that the vibration is stopped.

Except for the fact that in the vehicle tiredness alleviating system according to the third embodiment of the present invention, the heartbeat information BS is detected from the metal electrode 2 shown in FIG. 12, while in the vehicle tiredness alleviating system according to the seventh embodiment of the present invention, this is changed to the pulse wave sensor 72, the vibration sensor 73, and the pulse wave extracting means 74, the processing routine executed by the vehicle tiredness alleviating system according to the seventh embodiment of the present invention is similar to the processing routine executed by the vehicle tiredness alleviating system according to the third embodiment of the present invention using FIG. 14 and FIG. 15, so the explanation will be omitted.

While the invention has been described with reference to specific embodiments chosen for purpose of illustration, it should be apparent that numerous modifications could be made thereto by those skilled in the art without departing from the basic concept and scope of the invention.

What is claimed is:

1. A vehicle tiredness alleviating system comprising:
   a seat heating system for heating the surface of a seat;
   at least one of a vehicle air-conditioning system for controlling a temperature in a passenger compartment, and a seat vibration system for repeatedly vibrating a seat for a predetermined time,
   means for judging a tiredness degree of a passenger seated on a seat in said passenger compartment, cooling means for cooling said seat and
   cooling control means for controlling cooling by said cooling means based on results of judgment by said tiredness judging means, wherein
   said vehicle tiredness alleviating system performs at least one of temperature control of said vehicle air-conditioning system, temperature control of said seat heating system, and control of the vibration strength or vibration time of said seat vibration system based on the tiredness degree of said passenger, which is judged by said means for judging the tiredness degree;
   said seat heating system is provided with heating means for heating the seat, and
   said means for judging the tiredness degree is provided with seated person information detecting means for detecting seated person information relating to the seated person sitting on said seat, tiredness judging means for judging if said seated person is tired based on said seated person information, and heating control means for controlling the heating by said heating means based on the results of judgment by said tiredness judging means.

2. A vehicle tiredness alleviating system as set forth in claim 1, wherein said heating control means makes said heating means heat said seat when said tiredness judging means judges that said seated person is tired.

3. A vehicle tiredness alleviating system as set forth in claim 2, wherein said heating control means makes said heating means heat said seat for a predetermined duration when said tiredness judging means judges that said seated person is tired.

4. A vehicle tiredness alleviating system as set forth in claim 3, wherein:
   said tiredness judging means calculates a tiredness degree showing the extent of tiredness of said seated person based on said seated person information as criteria for judging if said seated person is tired, and
   said heating control means determines said predetermined duration based on said tiredness degree.

5. A vehicle tiredness alleviating system as set forth in claim 1, wherein said heating control means sets a target temperature of said seat based on said results of judgment by said tiredness judging means and controls the heating by said heating means so that said seat approaches said target temperature.

6. A vehicle tiredness alleviating system as set forth in claim 5, wherein:
said tiredness judging means calculates a tiredness degree showing the extent of tiredness of said seated person based on said seated person information as criteria for judging if said seated person is tired, and
said heating control means determines said target temperature based on said tiredness degree.

7. A vehicle tiredness alleviating system as set forth in claim 6, wherein said heating control means sets said target temperature to a first predetermined temperature when said tiredness degree is a first predetermined value to less than a second predetermined value and sets said target temperature to a second predetermined temperature higher than said first predetermined temperature when said tiredness degree is the second predetermined value or more.

8. A vehicle tiredness alleviating system as set forth in claim 7, wherein said first predetermined temperature is a temperature close to human skin temperature.

9. A vehicle tiredness alleviating system as set forth in claim 6, wherein said heating control means controls heating by said heating means for a predetermined duration so that said seat approaches said target temperature determined based on said tiredness degree when said tiredness judging means judges that said seated person is tired.

10. A vehicle tiredness alleviating system as set forth in claim 9, wherein said heating control means determines said predetermined duration based on said tiredness degree.

11. A vehicle tiredness alleviating system as set forth in claim 4, wherein said heating control means sets said predetermined duration to a first predetermined time when said tiredness degree is a third predetermined value to less than a fourth predetermined value and sets said predetermined duration to a second predetermined time longer than said first predetermined time when said tiredness degree is a fourth predetermined value or more.

12. A vehicle tiredness alleviating system as set forth in claim 1, wherein said cooling control means causes the cooling of said seat by said cooling means to stop when said tiredness judging means judges that said seated person is tired.

13. A vehicle tiredness alleviating system as set forth in claim 12, wherein said cooling control means causes the cooling of said seat by said cooling means to stop for a predetermined duration when said tiredness judging means judges that said seated person is tired.

14. A vehicle tiredness alleviating system as set forth in claim 13, wherein:
said tiredness judging means calculates a tiredness degree showing an extent of tiredness of said seated person based on said seated person information as criteria for judging if said seated person is tired, and
said cooling control means determines said predetermined duration based on said tiredness degree.

15. A vehicle tiredness alleviating system as set forth in claim 1, wherein said cooling control means sets a target temperature of said seat based on said results of judgment by said tiredness judging means and controls the cooling by said cooling means so that said seat approaches said target temperature.

16. A vehicle tiredness alleviating system as set forth in claim 15, wherein:
said tiredness judging means calculates a tiredness degree showing an extent of tiredness of said seated person based on said seated person information as criteria for judging if said seated person is tired, and
said cooling control means determines said target temperature based on said tiredness degree.

17. A vehicle tiredness alleviating system as set forth in claim 16, wherein said cooling control means sets said target temperature at a first predetermined temperature when said tiredness degree is a first predetermined value to less than a second predetermined value and sets said target temperature to a second predetermined temperature higher than said first predetermined temperature when said tiredness degree is the second predetermined value or more.

18. A vehicle tiredness alleviating system as set forth in claim 17, wherein said first predetermined temperature is a temperature close to human skin temperature.

19. A vehicle tiredness alleviating system as set forth in claim 16, wherein said cooling control means controls the cooling by said cooling means for a predetermined duration so that said seat approaches said target temperature determined based on said tiredness degree when said tiredness judging means judges that said seated person is tired.

20. A vehicle tiredness alleviating system as set forth in claim 19, wherein said cooling control means determines said predetermined duration based on said tiredness degree.

21. A vehicle tiredness alleviating system as set forth in claim 14, wherein said cooling control means sets said predetermined duration to a first predetermined time when said tiredness degree is a third predetermined value to less than a fourth predetermined value and sets said predetermined duration to a second predetermined time longer than said first predetermined time when said tiredness degree is a fourth predetermined value or more.

22. A vehicle tiredness alleviating system as set forth in claim 1, wherein said seated person information detecting means detects at least one of bio information, motion information, and seated duration of said seated person, as said seated person information.

23. A vehicle tiredness alleviating system as set forth in claim 4, wherein:
said seated person information detecting means detects a heartbeat signal from said seated person as said seated person information and
said tiredness judging means calculates said tiredness degree based on said heartbeat signal.

24. A vehicle tiredness alleviating system as set forth in claim 23, wherein said tiredness judging means calculates a normal number of heartbeats and a current number of heartbeats of said seated person from said heartbeat signal and calculates the ratio by which said current number of heartbeats falls compared with said normal number of heartbeats as said tiredness degree.

25. A vehicle tiredness alleviating system as set forth in claim 1, wherein:
said seat vibration system has a vibration generating means for making a seat vibrate, and
a vibration control means for controlling vibration by said vibration generating means based on results of judgment by said tiredness judging means.

26. A vehicle tiredness alleviating system as set forth in claim 25, wherein said vibration control means causes said vibration generating means to vibrate said seat when said tiredness judging means judges that said seated person is tired.

27. A vehicle tiredness alleviating system as set forth in claim 26, wherein said vibration control means causes said vibration generating means to vibrate said seat for a predetermined duration when said tiredness judging means judges that said seated person is tired.

28. A vehicle tiredness alleviating system as set forth in claim 27, wherein:

said tiredness judging means calculates a tiredness degree showing an extent of tiredness of said seated person based on said seated person information as criteria for judging if said seated person is tired, and said vibration control means determines said predetermined duration based on said tiredness degree.

29. A vehicle tiredness alleviating system as set forth in claim 25, wherein said vibration control means sets the strength of vibration of said seat based on said results of judgment by said tiredness judging means and controls vibration by said vibration generating means so that said seat vibrates by said strength.

30. A vehicle tiredness alleviating system as set forth in claim 29, wherein:

said tiredness judging means calculates a tiredness degree showing an extent of tiredness of said seated person based on said seated person information as a criteria for judging if said seated person is tired, and said vibration control means determines said strength based on said tiredness degree.

31. A vehicle tiredness alleviating system as set forth in claim 30, wherein said vibration control means sets said strength to a first predetermined strength when said tiredness degree is a first predetermined value to less than a second predetermined value and sets said strength to a second predetermined strength higher than said first predetermined strength when said tiredness degree is said second predetermined value or more.

32. A vehicle tiredness alleviating system as set forth in claim 30, wherein said vibration control means controls vibration by said vibration generating means for a predetermined duration so that said seat vibrates by said strength determined based on said tiredness degree when said tiredness judging means judges that said seated person is tired.

33. A vehicle tiredness alleviating system as set forth in claim 32, wherein said vibration control means determines said predetermined duration based on said tiredness degree.

34. A vehicle tiredness alleviating system provided with at least one of a vehicle air-conditioning system for controlling a temperature in a passenger compartment, a seat heating system for heating the surface of a seat, and a seat vibration system for repeatedly vibrating a seat for a predetermined time, said vehicle tiredness alleviating system further provided with a means for judging the tiredness degree of a passenger seated on a seat in said passenger compartment, wherein said vehicle tiredness alleviating system performs at least one of temperature control of said vehicle air-conditioning system, temperature control of said seat heating system, and control of the vibration strength or vibration time of said seat vibration system based on the tiredness degree of said passenger, which is judged by said means for judging the tiredness degree;

said seat vibration system has a vibration generating means for making a seat vibrate, and said means for judging the tiredness degree is provided with:

a seated person information detecting means for detecting seated person information relating to a seated person sitting on said seat, a tiredness judging means for judging if said seated person is tired based on said seated person information, a vibration control means for controlling vibration by said vibration generating means based on results of judgment by said tiredness judging means;

said vibration control means causes said vibration generating means to vibrate said seat when said tiredness judging means judges that said seated person is tired;

wherein said vibration control means causes said vibration generating means to vibrate said seat for a predetermined duration when said tiredness judging means judges that said seated person is tired;

said tiredness judging means calculates a tiredness degree showing an extent of tiredness of said seated person based on said seated person information as criteria for judging if said seated person is tired, and said vibration control means determines said predetermined duration based on said tiredness degree; and said vibration control means sets said predetermined duration to a first predetermined time when said tiredness degree is a third predetermined value to less than a fourth predetermined value and sets said predetermined duration to a second predetermined time longer than said first predetermined time when said tiredness degree is said fourth predetermined value or more.

35. A vehicle tiredness alleviating system as set forth in claim 25, wherein said seated person information detecting means detects at least one of bio information, motion information, and seated duration of said seated person, as said seated person information.

36. A vehicle tiredness alleviating system as set forth in claim 28, wherein:

said seated person information detecting means detects a heartbeat signal from said seated person as said seated person information, and said tiredness judging means calculates said tiredness degree based on said heartbeat signal.

37. A vehicle tiredness alleviating system as set forth in claim 36, wherein said tiredness judging means calculates a normal number of heartbeats and current number of heartbeats of said seated person from said heartbeat signal and calculates the ratio by which said current number of heartbeats falls compared with said normal number of heartbeats as said tiredness degree.

38. A vehicle tiredness alleviating system provided with at least one of a vehicle air-conditioning system for controlling a temperature in a passenger compartment, a seat heating system for heating the surface of a seat, and a seat vibration system for repeatedly vibrating a seat for a predetermined time, said vehicle tiredness alleviating system further provided with a means for judging the tiredness degree of a passenger seated on a seat in said passenger compartment, wherein said vehicle tiredness alleviating system performs at least one of temperature control of said vehicle air-conditioning system, temperature control of said seat heating system, and control of the vibration strength or vibration time of said seat vibration system based on the tiredness degree of said passenger, which is judged by said means for judging the tiredness degree;

said means for judging the tiredness degree of said passenger is comprised of:

a pulse wave sensor provided at a driver's seat for detecting a pulse wave of the drive, a vibration sensor provided at said driver's seat for detecting vibration of said driver's seat, pulse wave extracting means for extracting a pulse wave component based on a detection signal of said pulse wave sensor and a detection signal of said vibration sensor, and tiredness judging means for judging tiredness of the driver based on a pulse wave component extracted by said pulse wave extracting means and outputting a command signal based on said judged tiredness to an air-conditioning system unit of said vehicle air-conditioning system.

39. A vehicle tiredness alleviating system as set forth in claim 38, wherein said pulse wave sensor is provided at a portion of a high seating pressure at said driver's seat and said vibration sensor is provided at a portion of a low seating pressure at said driver's seat.

* * * * *